United States Patent
Osaki

(10) Patent No.: US 10,958,805 B2
(45) Date of Patent: Mar. 23, 2021

(54) IMAGE READING APPARATUS, NON-TRANSITORY COMPUTER-READABLE MEDIUM FOR IMAGE READING APPARATUS, AND METHOD FOR CONTROLLING IMAGE READING APPARATUS

(71) Applicant: BROTHER KOGYO KABUSHIKI KAISHA, Aichi (JP)

(72) Inventor: Masayoshi Osaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/190,216

(22) Filed: Nov. 14, 2018

(65) Prior Publication Data

US 2019/0166279 A1    May 30, 2019

(30) Foreign Application Priority Data

Nov. 30, 2017    (JP) .............................. JP2017-230918

(51) Int. Cl.
*G06F 15/00*     (2006.01)
*H04N 1/10*      (2006.01)
*H04N 1/00*      (2006.01)

(52) U.S. Cl.
CPC ........... *H04N 1/10* (2013.01); *H04N 1/00018* (2013.01); *H04N 1/00111* (2013.01); *H04N 1/00122* (2013.01)

(58) Field of Classification Search
CPC .. H04N 1/10; H04N 1/00018; H04N 1/00111; H04N 1/00122
USPC ......................................................... 358/462
See application file for complete search history.

(56) References Cited

U.S. PATENT DOCUMENTS

2008/0024845 A1 *   1/2008   Makino .................. H04N 1/387
                                                         358/538

FOREIGN PATENT DOCUMENTS

JP    2009-253456 A    10/2009
JP    2012-160896 A    8/2012

* cited by examiner

*Primary Examiner* — Mark R Milia
(74) *Attorney, Agent, or Firm* — Scully, Scott, Murphy & Presser, P.C.

(57) ABSTRACT

In an image reading apparatus, in a case where the processor determines that the original image to be obtained represents a book document, the processor determines whether a value satisfies a prescribed condition. The value is based on a difference between a first density distribution of an image in a first partial region of the entire image and a second density distribution of an image in a second partial region of the entire image. The first partial region includes a part of a dark region. The dark region extends in an extending direction. The first partial region extends in a crossing direction crossing the extending direction. The second partial region includes another part of the dark region and extends in the crossing direction. In a case where the value satisfies the prescribed condition, the processor controls the reading device to interrupt reading the entire image.

12 Claims, 11 Drawing Sheets

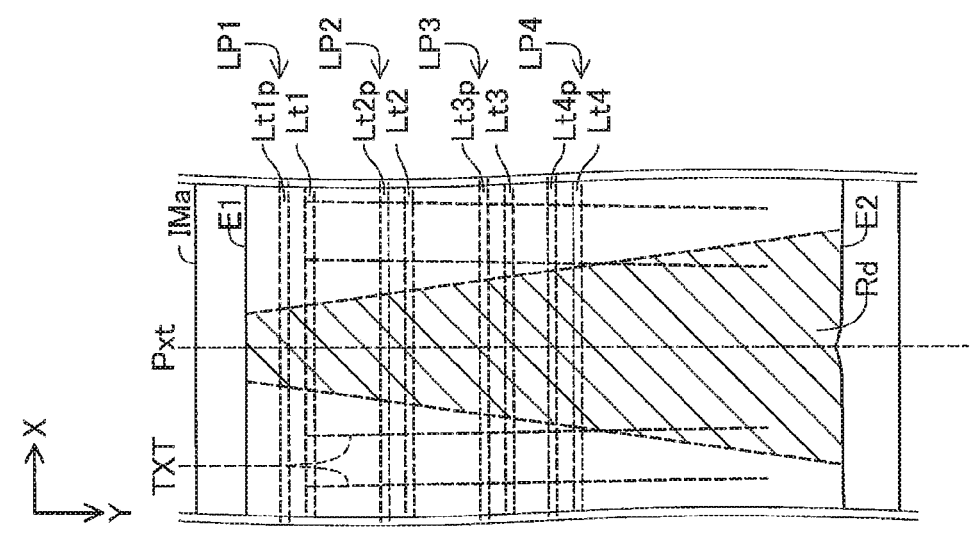
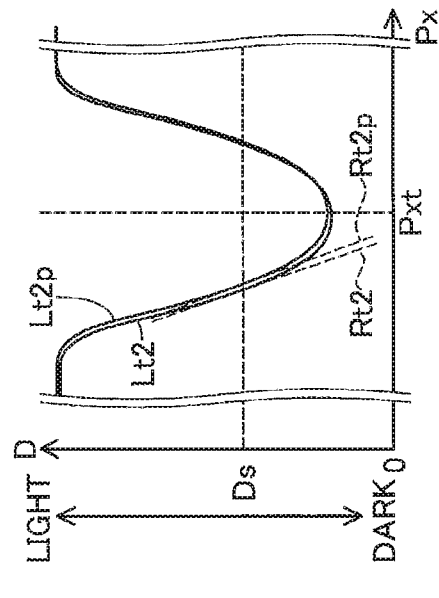
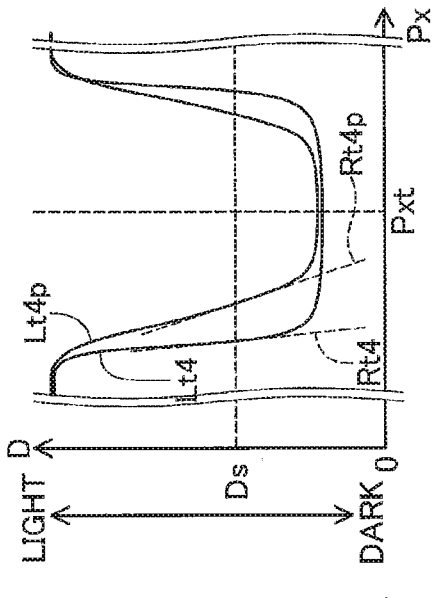
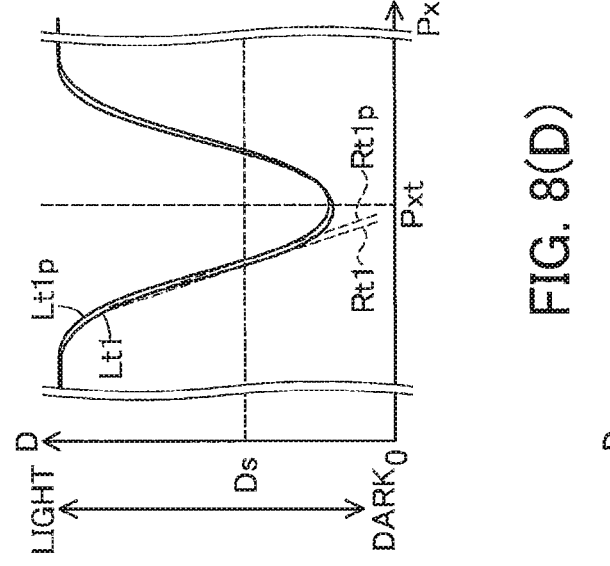
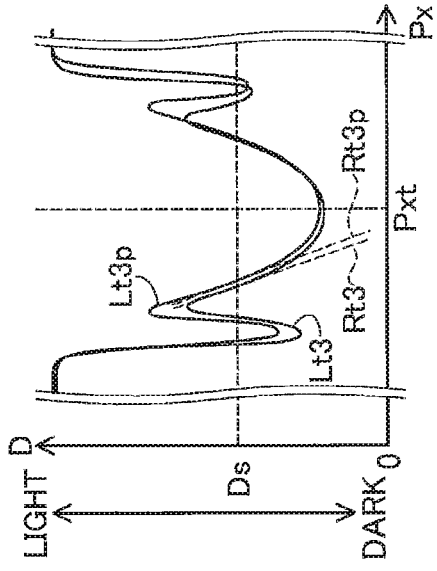

US 10,958,805 B2

IMAGE READING APPARATUS, NON-TRANSITORY COMPUTER-READABLE MEDIUM FOR IMAGE READING APPARATUS, AND METHOD FOR CONTROLLING IMAGE READING APPARATUS

CROSS REFERENCE TO RELATED APPLICATION

This application claims priority from Japanese Patent Application No. 2017-230918 filed Nov. 30, 2017. The entire content of the priority application is incorporated herein by reference.

TECHNICAL FIELD

The present disclosure relates to a technology for optically reading an original document.

BACKGROUND

Conventionally, images have been read from originals using a reading apparatus called a scanner. A book or other bound document can be opened and placed on the original platen of the scanner to read two pages worth of the original at once. Here, if the force with which the two pages of the original are pressed against the original platen is too weak, the center region of the two pages floats off the platen, producing a dark part in the scanned image along the center region. If the dark part overlaps text in the original image, the text may be illegible. Known technologies determine that a suitable amount of pressure is being applied to the original to press the original against the platen when the width of the dark part is less than a threshold value.

SUMMARY

However, the width of the dark part along the center region of the original differs according to the original. Therefore, the state of overlap between the dark part and text or other information differs according to the original. Consequently, the image read by the scanner may represent information in the original (text, for example) inaccurately.

In view of the foregoing, it is an object of the present disclosure to provide a technique for restricting the reading of images that inaccurately represent information in the original.

In order to attain the above and other objects, the disclosure provides an image reading apparatus. The image reading apparatus includes a platen, a reading device, and a processor. The platen is configured to support an original. The reading device is configured to optically read the original supported on the platen to obtain a plurality of line images for an entire image including an original image representing the original. The processor is configured to perform: controlling the reading device to start reading; before completing reading the entire image, determining whether the image to be obtained represents a book document spread open on the platen, the book document indicating a bound document; in a case where the processor determines that the original image to be obtained represents the book document, determining whether a value satisfies a prescribed condition, the value being based on a difference between a first density distribution of an image in a first partial region of the entire image and a second density distribution of an image in a second partial region of the entire image, the first partial region including a part of a dark region, the dark region extending in an extending direction and an image in the dark region having a density larger than a prescribed density threshold value, the first partial region extending in a crossing direction crossing the extending direction, the second partial region including another part of the dark region and extending in the crossing direction, the second partial region being shifted from the first partial region with respect to the extending direction; in a case where the value satisfies the prescribed condition, controlling the reading device to interrupt reading the entire image; and in a case where the value does not satisfy the prescribed condition: controlling the reading device to continue reading the entire image so that all of the plurality of line images is read; and generating read data using the plurality of line images.

According to another aspect, the disclosure provides a non-transitory computer-readable recording medium storing computer-readable instructions for an image reading apparatus including: a platen configured to support an original; a reading device configured to optically read the original supported on the platen to obtain a plurality of line images for an entire image including an original image representing the original; and a processor. The computer-readable instructions, when executed by the processor, cause the image reading apparatus to perform: controlling the reading device to start reading; before completing reading the entire image, determining whether the image to be obtained represents a book document spread open on the platen, the book document indicating a bound document; in a case where it is determined that the original image to be obtained represents the book document, determining whether a value satisfies a prescribed condition, the value being based on a difference between a first density distribution of an image in a first partial region of the entire image and a second density distribution of an image in a second partial region of the entire image, the first partial region including a part of a dark region, the dark region extending in an extending direction and an image in the dark region having a density larger than a prescribed density threshold value, the first partial region extending in a crossing direction crossing the extending direction, the second partial region including another part of the dark region and extending in the crossing direction, the second partial region being shifted from the first partial region with respect to the extending direction; in a case where the value satisfies the prescribed condition, controlling the reading device to interrupt reading the entire image; and in a case where the value does not satisfy the prescribed condition: controlling the reading device to continue reading the entire image so that all of the plurality of line images is read; and generating read data using the plurality of line images.

According to still another aspect, the disclosure provides a method for controlling an image reading apparatus including: a platen configured to support an original; a reading device configured to optically read the original supported on the platen to obtain a plurality of line images for an entire image including an original image representing the original; and a processor. The method includes: controlling the reading device to start reading; before completing reading the entire image, determining whether the image to be obtained represents a book document spread open on the platen, the book document indicating a bound document; in a case where it is determined that the original image to be obtained represents the book document, determining whether a value satisfies a prescribed condition, the value being based on a difference between a first density distribution of an image in a first partial region of the entire image and a second density distribution of an image in a second partial region of the entire image, the first partial region including a part of a dark region, the dark region extending in an extending direction and an image in the dark region having a density larger than a prescribed density threshold value, the first partial region extending in a crossing direction crossing the extending direction, the second partial region including another part of the dark region and extending in the crossing direction, the second partial region being shifted from the first partial region with respect to the extending direction; in a case where the value satisfies the prescribed condition, controlling the reading device to interrupt reading the entire image; and in a case where the value does not satisfy the prescribed condition: controlling the reading device to continue reading the entire image so that all of the plurality of line images is read; and generating read data using the plurality of line images.

BRIEF DESCRIPTION OF THE DRAWINGS

The particular features and advantages of the disclosure as well as other objects will become apparent from the following description taken in connection with the accompanying drawings, in which:

FIG. 8(A) is a schematic diagram illustrating examples of target line images according to the second embodiment;

FIGS. 8(B)-8(E) are graphs illustrating density distributions in the target line images;

DETAILED DESCRIPTION

A. First Embodiment

A-1. Structure of an Image-Reading Apparatus

Figure 1:
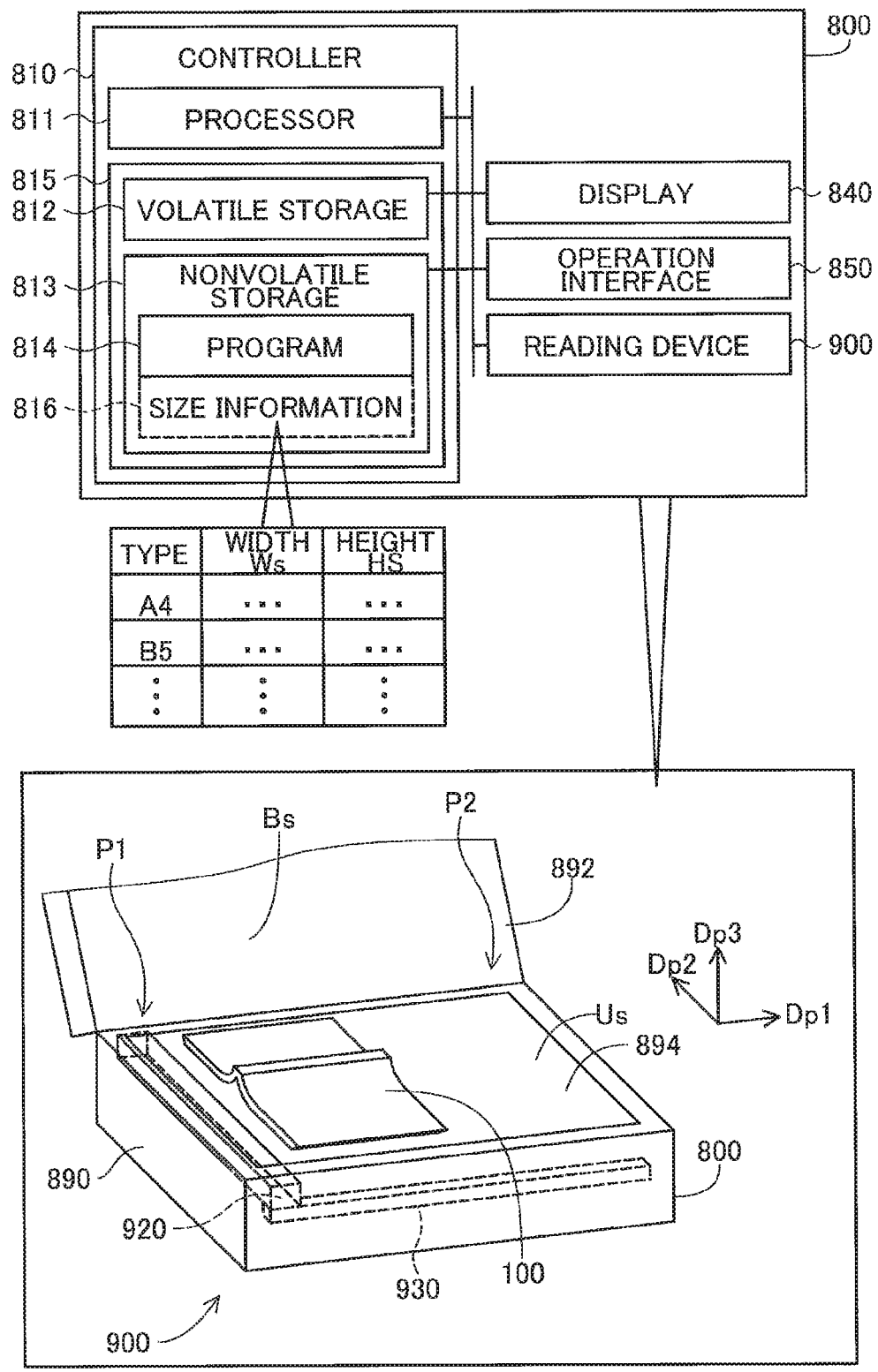
FIG. 1 is a schematic diagram illustrating a structure of an image-reading apparatus according to a first embodiment.

FIG. 1 shows the structure of an image-reading apparatus 800 according to a first embodiment of the present disclosure. In the embodiment, the image-reading apparatus 800 is a scanner. The image-reading apparatus 800 is provided with a display 840 that displays images, an operation interface 850 that receives user operations, a reading device 900 that reads images, and a controller 810 that controls operations of the image-reading apparatus 800.

The display 840 is a device that displays images, such as a liquid crystal display. However, any of various other types of devices that display images may be used as the display 840, such as an LED display or an organic light-emitting diode (OLED) display. The operation interface 850 is a device that receives user operations, such as a touch panel overlapping the display 840. However, other types of devices operated by a user may be employed as the operation interface 850, such as buttons, levers, and the like. By operating the operation interface 850, the user can input various commands in the image-reading apparatus 800.

A perspective view of the image-reading apparatus 800 is shown in the bottom portion of FIG. 1. In this perspective view, a first direction Dp1 and a second direction Dp2 indicate horizontal directions, while a third direction Dp3 indicates the vertically upward direction. The first direction Dp1 and the second direction Dp2 are perpendicular to each other. Hereinafter, the third direction Dp3 will be called the upward direction Dp3.

The image-reading apparatus 800 is a flatbed image-reading apparatus. The image-reading apparatus 800 is provided with a main body 890, and a cover 892 that is assembled on the main body 890 so as to be capable of opening toward the upward direction Dp3 side. FIG. 1 shows the image-reading apparatus 800 when the cover 892 is opened toward the upward direction Dp3 side.

A support platen 894 is disposed on the upward direction Dp3 side of the main body 890. The support platen 894 is exposed when the cover 892 is opened toward the upward direction Dp3 side. The support platen 894 has a substantially rectangular shape defined by two sides parallel to the first direction Dp1 and two sides parallel to the second direction Dp2, and is configured of a transparent plate (a glass plate, for example). The surface of the support platen 894 on the upward direction Dp3 side will be called a support surface Us that supports the original being read.

The reading device 900 is accommodated inside the main body 890. The reading device 900 includes an image sensor 920 that optically reads originals, and a moving device 930 that moves the image sensor 920 in the first direction Dp1.

The image sensor 920 is disposed on the underside of the support platen 894 (the side opposite the upward direction Dp3). In the embodiment, the image sensor 920 is a one-dimensional image sensor that optically reads originals and is configured of a plurality of photoelectric conversion elements (or simply "optical elements"), such as CCDs or CMOSs arrayed in the second direction Dp2. The image sensor 920 optically reads an original placed on the support platen 894 and outputs signals representing the optically read original.

The moving device 930 includes a drive source, such as an electric motor. The moving device 930 uses the drive source to move the image sensor 920 in directions parallel to the support surface Us of the support platen 894 (and specifically directions parallel to the first direction Dp1).

The controller 810 is also accommodated in the main body 890. As shown in the top section of FIG. 1, the controller 810 includes a processor 811, and a storage 815. The storage 815 includes a volatile storage 812, and a nonvolatile storage 813. The processor 811 is an arithmetic and logic unit (a CPU, for example) for processing data. The volatile storage 812 is DRAM, for example, and the nonvolatile storage 813 is flash memory, for example. The components of the controller 810 and the display 840, the operation interface 850, and the reading device 900 are interconnected via a bus. The nonvolatile storage 813 stores a program 814. Note that the nonvolatile storage 813 may also store size information 816. The size information 816 will be described later in greater detail in a variation.

By executing the program 814, the processor 811 controls the reading device 900. More specifically, by controlling the moving device 930, the processor 811 moves the image sensor 920 along the support platen 894 in the first direction Dp1 from a position P1 on the upstream end of the support platen 894 in the first direction Dp1 to a position P2 on the downstream end in the first direction Dp1. While moving the image sensor 920, the processor 811 controls the image sensor 920 to optically read the original supported on the support platen 894. The processor 811 uses the signals outputted from the image sensor 920 to generate scanned image data as the image data of the original (described later in greater detail). Hereinafter, the moving direction Dp1 of the image sensor 920 when the image sensor 920 reads an image will also be called the scanning direction Dp1. The processor 811 also temporarily stores various intermediate data used when executing the program 814 in the storage 815 (one of the volatile storage 812 or nonvolatile storage 813, for example). The program 814 may be provided by the manufacturer of the image-reading apparatus 800, for example.

A-2. Image Process

Figure 2:
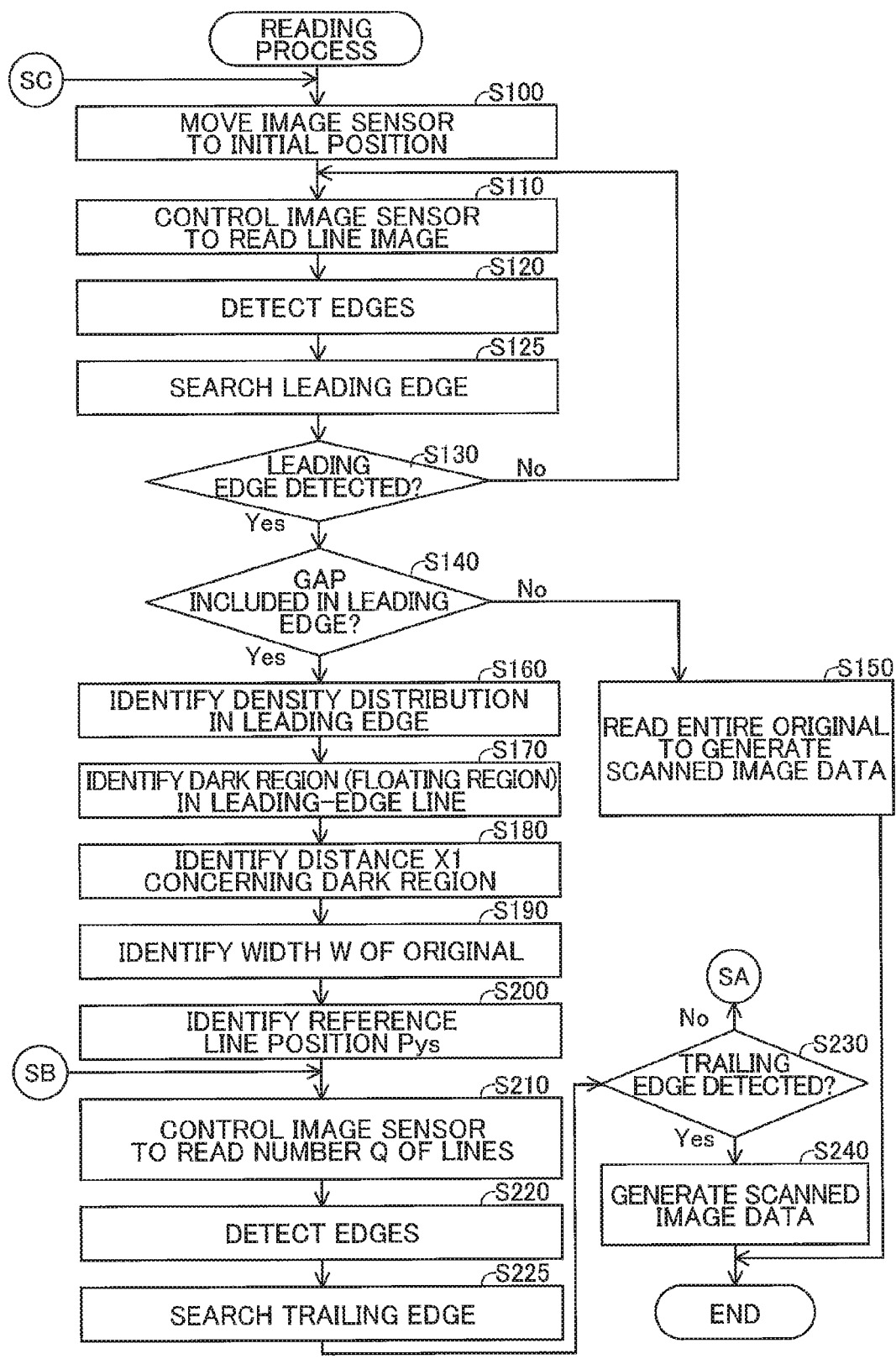
FIG. 2 is a flowchart illustrating a part of a reading process according to the first embodiment.
Figure 3:
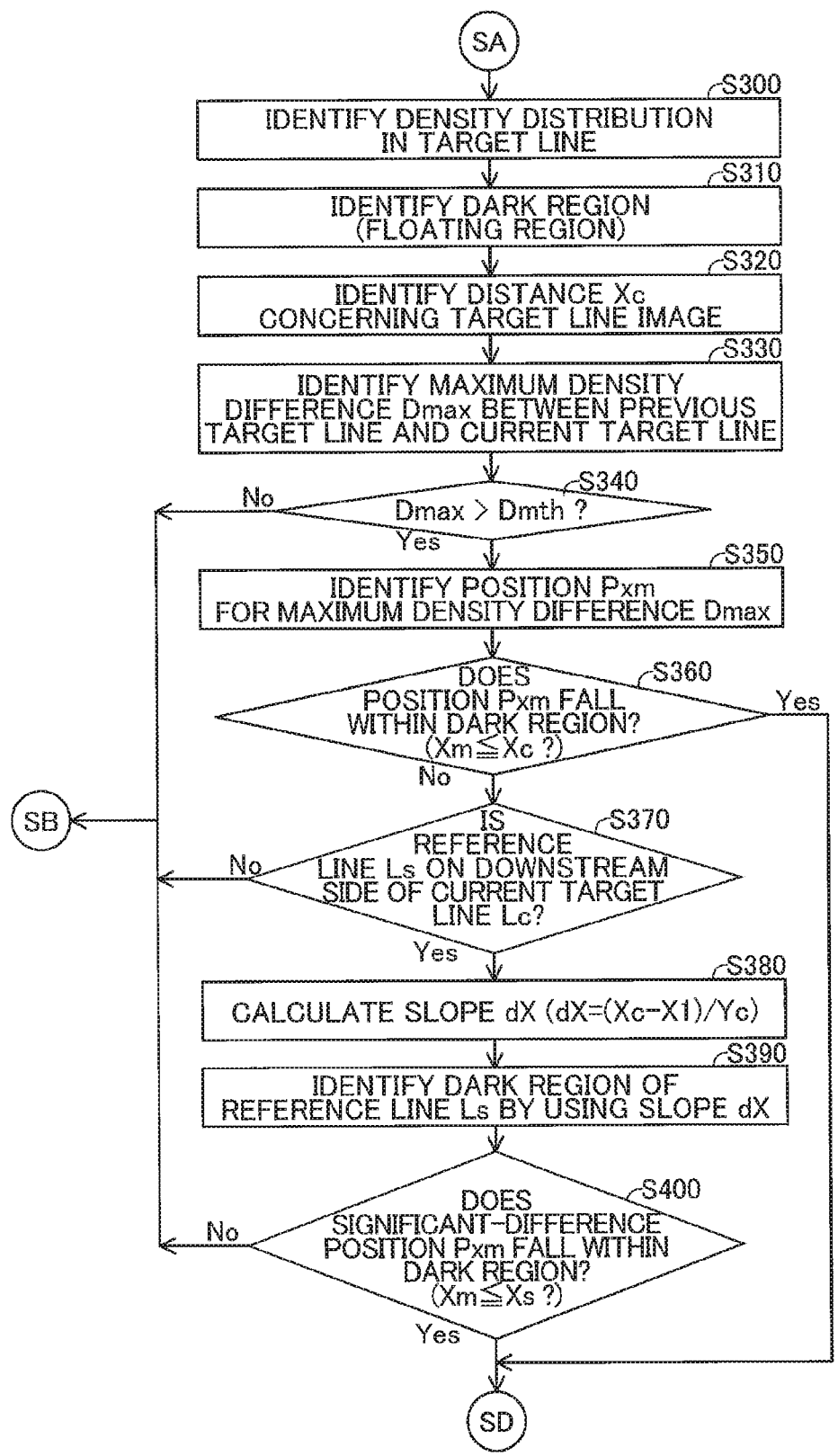
FIG. 3 is a flowchart illustrating a part of the reading process continuing from the flowchart shown in FIG. 2.
Figure 4:
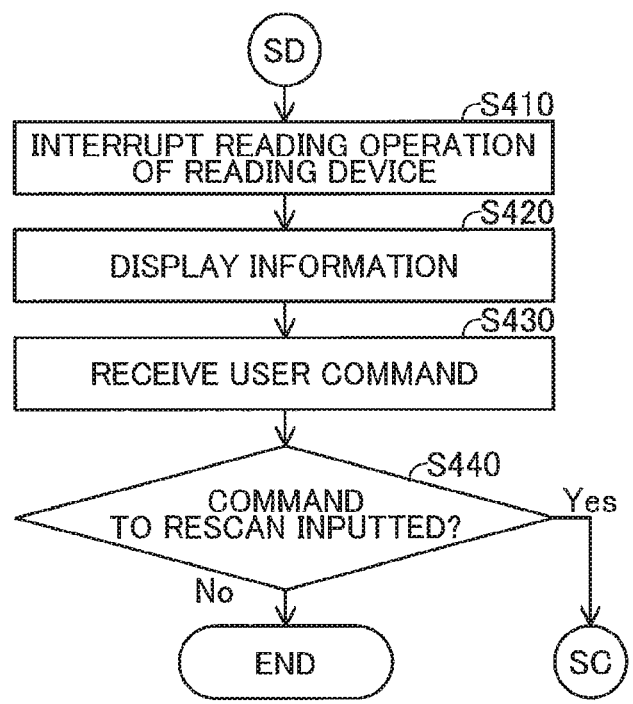
FIG. 4 is a flowchart illustrating a part of the reading process continuing from the flowchart shown in FIG. 3.

FIGS. 2 through 4 are flowcharts illustrating an example of a reading process. FIG. 3 is a continuation of FIG. 2, and FIG. 4 is a continuation of FIG. 3. In the reading process, the reading device 900 reads an original and generates scanned image data for two-page worth of the original. In the perspective view of FIG. 1, an original 100 is shown on top of the support surface Us. The original 100 is a book serving as an example of a bound document that has been spread open on the support surface Us. In the reading process of the embodiment, the processor 811 determines whether the original 100 can be read properly when the original being read is a book of this type. Below, an example of reading the original 100 will be described. When the original 100 is a book, the original 100 may also be called a "book document 100" in the following description.

The processor 811 begins the reading process when the user inputs a command in the operation interface 850 to start the reading process. In S100 of FIG. 2 the processor 811 moves the image sensor 920 to an initial position. In the embodiment, the position P1 shown in FIG. 1, i.e., the position P1 on the upstream end of the support platen 894 in the first direction Dp1 serves as the initial position (hereinafter called the initial position P1). In S110 the processor 811 controls the image sensor 920 to read an image for a line. Based on signals received from the image sensor 920, the processor 811 generates line image data representing a line image of the line opposing the image sensor 920. A line image is an image of a linear region extending in the second direction Dp2. A line image is represented by color values for each of the plurality of pixels arrayed in the second direction Dp2.

Once the image at the current position of the image sensor 920 has been read, the processor 811 moves the image sensor 920 in the scanning direction Dp1 a distance equivalent to the width of one line. Subsequently, the processor 811 controls the image sensor 920 to read a line image at the new position.

The line image data may be expressed in various formats. In the embodiment, the line image data may be either RGB image data that includes RGB values for each of the plurality of pixels in the line, or monochrome image data that includes a luminance value for each of the plurality of pixels. The RGB values for a single pixel represent the color of that pixel and include three component values for red (R), green (G), and blue (B) (hereinafter called the "R value," "G value," and "B value," respectively), for example. In the embodiment, each of the color components is set to one of a possible 256 gradations. The luminance value specifies the luminance of a pixel in one of 256 gradations, for example. Note that the data format may be selected according to a user specification.

Figure 5A:
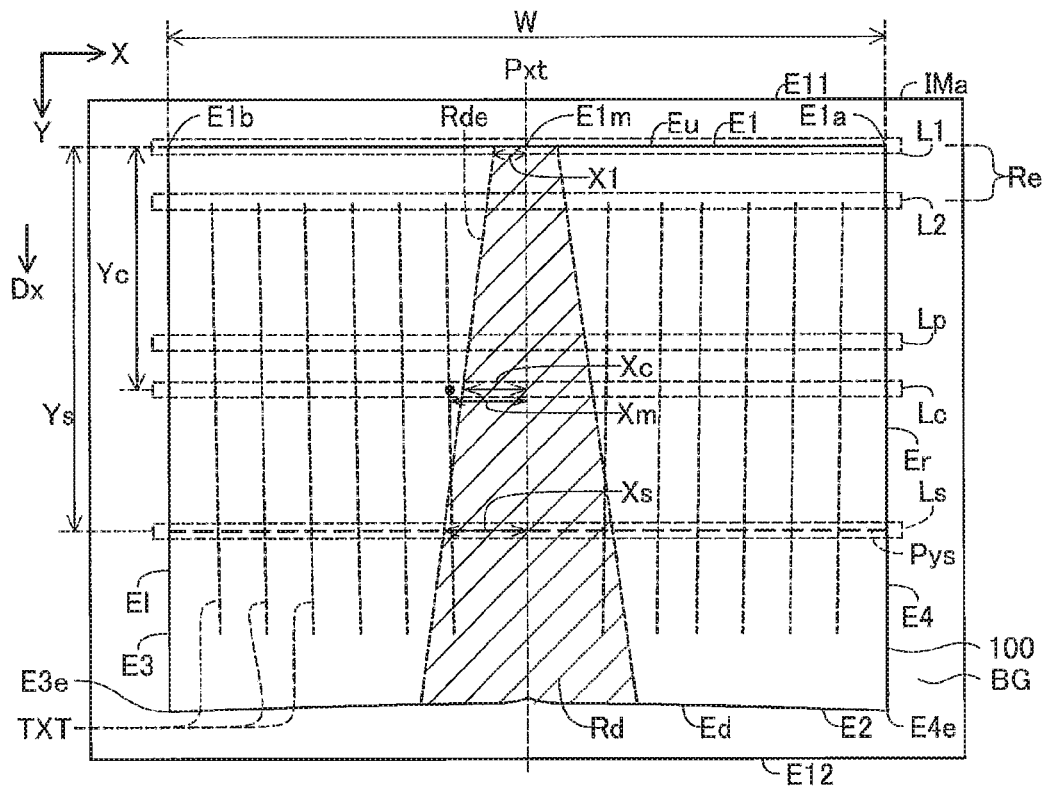
FIG. 5(A) is a schematic diagram illustrating an example of a scanned image.

As will be described later, the processor 811 repeatedly alternates between performing the process for controlling the image sensor 920 to read a line image and performing the process for moving the image sensor 920 in the first direction Dp1. Through these operations, the processor 811 can read an image for the entire region on the support surface Us. FIG. 5(A) is a schematic diagram showing an example of a scanned image. The scanned image IMa includes an upstream edge E11 and a downstream edge E12 in the Y-direction. The scanned image IMa includes an image of the original 100. The original 100 represents character strings TXT written vertically. The reading process of the present disclosure can be applied in a case where an original representing character strings is written horizontally. The region BG surrounding the original 100 represents the background (hereinafter called the "background region BG"). Here, the background region BG represents the opposing surface Bs of the cover 892 (see FIG. 1) that opposes the support platen 894 when the cover 892 is closed. In the embodiment, the opposing surface Bs has a gray color that is darker than white and lighter than black. Hence, the background region BG is a substantially monochromatic gray image. The X-direction indicated in FIG. 5(A) corresponds to the second direction Dp2 in FIG. 1, and the Y-direction corresponds to the first direction Dp1. The scanned image IMa has a rectangular shape defined by lines parallel to the X-direction and lines parallel to the Y-direction. The pixels representing the scanned image IMa are arranged in a grid aligned in the X- and Y-directions. Line images L1, L2, Lp, Lc, and Ls in FIG. 5(A) represent examples of line images read by the image sensor 920.

A region Rd in the scanned image IMa of FIG. 5(A) depicted with hatching denotes the area of the image representing the original 100 that includes the bound portion. In the example of FIG. 5(A), the bound portion extends in the Y-direction (i.e., the first direction Dp1 in FIG. 1). In other words, the height direction of the book document 100 is substantially parallel to the Y-direction. Hereinafter, the direction in which the region Rd extends will be called the extending direction Dx. In the example of FIG. 5(A), the extending direction Dx is substantially parallel to the Y-direction.

The bound portion of the original 100 tends to rise off the support surface Us (see FIG. 1). This raised portion is difficult to read properly. The raised portion may be rendered in the scanned image IMa as a color with higher density, i.e., a darker color (black, for example). Thus, the region Rd denotes the portion of the original 100 that floats off the support surface Us and is rendered in a darker color. Hereinafter, the region Rd may also be called the "dark region Rd" or the "floating region Rd." The width of the dark region Rd (i.e., the dimension in the width direction of the book document 100) may vary at different positions in the height direction of the original 100. In the example of FIG. 5(A), the width of the dark region Rd increases in the Y-direction.

A top edge Eu, a bottom edge Ed, a right edge Er, and a left edge E1 of the original 100 are depicted in FIG. 5(A) with reference to the extending direction Dx and a direction orthogonal to the extending direction Dx. The top edge Eu, the bottom edge Ed, the right edge Er, and the left edge E1 respectively indicate the edges on the upward, downward, rightward, and leftward sides of the original 100. For example, the top edge Eu is on the side in the upward direction parallel to the extending direction Dx. Normally, the original 100 has a substantial rectangular shape. The extending direction Dx of the dark region Rd is thus substantially parallel to the short sides (here, the right edge Er and left edge E1) of the substantially rectangular original 100. The dark region Rd extends from the center portion of one long side of the substantially rectangular original 100 (the bottom edge Ed, for example) to the center portion of the other long side (the top edge Eu, for example).

In S120 of FIG. 2, the processor 811 detects edges of the original 100 by analyzing the acquired line image. In the embodiment, the processor 811 executes an edge extraction process to extract edge pixels in the image. Various edge extraction processes are known in the art for extracting edge pixels that indicate an edge in the image. For example, the edge strength may be calculated for each pixel, and pixels having an edge strength that exceeds a threshold may be extracted as edge pixels. Various operators may be used for calculating edge strength, including the Sobel operator and the Prewitt operator.

Figure 5B:
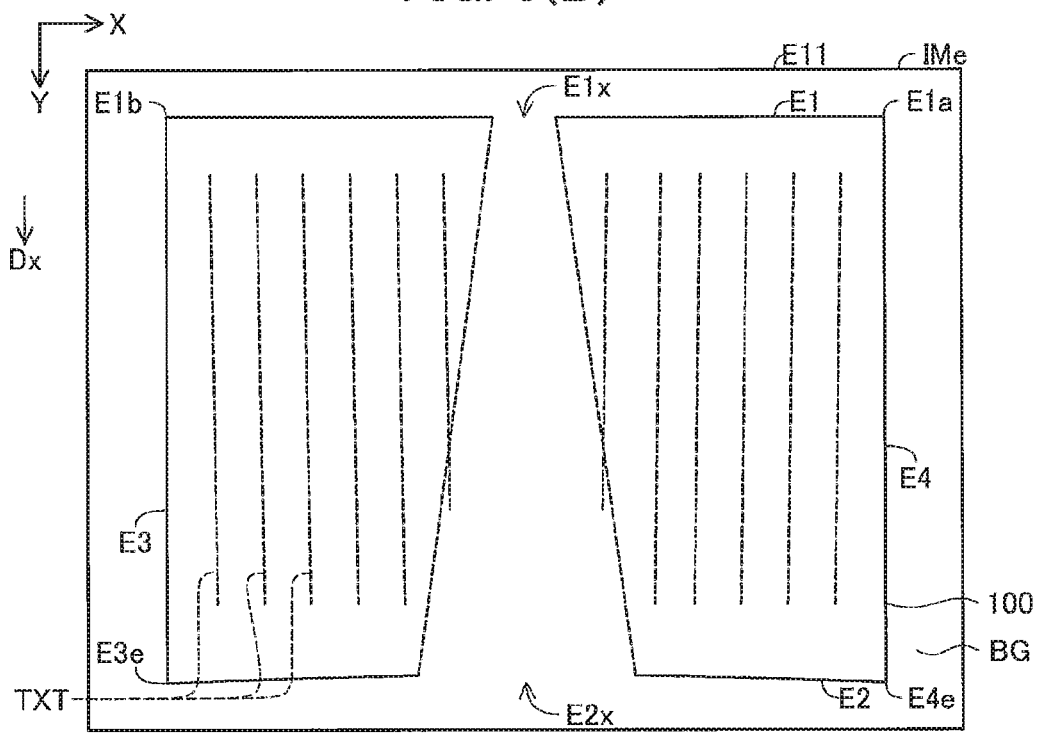
FIG. 5(B) is a schematic diagram illustrating an example of an edge image.

FIG. 5(B) is a schematic diagram showing an example of an edge image IMe. The edge image IMe is represented by edge pixels. The edge image IMe in FIG. 5(B) is a sample image acquired from the scanned image IMa in FIG. 5(A). In the example of FIG. 5(B), the plurality of edge pixels includes pixels denoting the edges of the original 100, and pixels denoting objects in the original 100 (outlines of characters in the character strings TXT in this example).

FIGS. 5(A) and 5(B) also show edges E1, E2, E3, and E4 of the original 100 based on the Y-direction or the X-direction, which corresponds to the scanning direction Dp1 in FIG. 1. The first edge E1 (also called the "leading edge E1") is the edge on the upstream side in the Y-direction (i.e., the upstream side in the scanning direction Dp1). The second edge E2 (also called the "trailing edge E2") is the edge on the downstream side in the Y-direction corresponding to the scanning direction Dp1. The third edge E3 is on the upstream side in the X-direction, and the fourth edge E4 is on the downstream side in the X-direction.

Each of the edges E1 and E2 is a broken line broken at a center thereof. That is, in the part of each of the edges E1 and E2 (the top edge Eu and bottom edge Ed in this example) that borders the dark region Rd, edge pixels cannot be detected because the borderline between the background region BG and original 100 is indistinct. Consequently, the edge image IMe (FIG. 5(B)) has gaps E1x and E2x in the center portions of the corresponding edges E1 and E2.

In S125 of FIG. 2, the processor 811 searches the leading edge E1 of the original 100. The process for detecting the leading edge E1 may be any of various processes capable of detecting the leading edge E1. In the embodiment, the processor 811 detects an edge line formed by arranging the plurality of edge pixels detected in S120 substantially in the X-direction. The process for detecting the edge line may be any of various well-known processes capable of detecting an edge line. For example, the processor 811 may detect an edge line corresponding to the leading edge E1 by executing the Hough transform using the edge pixels. Since the Hough transform is a well-known process, a description of this process has been omitted. In addition to edge lines indicating edges of the original 100, the Hough transform can detect various edge lines such as edge lines indicating the edges of objects (characters and photos, for example) depicted in the original 100. The processor 811 adopts the edge line nearest the upstream edge E11 of the scanned image IMa in the Y-direction as the edge line specifying the leading edge E1. Note that the leading edge E1 will not be detected if the position of the target line image has not arrived at the leading edge E1.

In S130 of FIG. 2, the processor 811 determines whether the leading edge E1 was detected. If the leading edge E1 was not detected (S130: NO), the processor 811 repeats the process in S110 through S130 until the leading edge E1 is detected.

When the leading edge E1 was detected (S130: YES), in S140 the processor 811 determines whether the leading edge E1 includes a gap in its center portion. Any of various methods capable of identifying the existence of a gap may be used for this determination. For example, the processor 811 determines that the leading edge E1 includes a gap in its center portion when a gap E1x of a length greater than or equal to a prescribed threshold value is formed in an edge line representing the leading edge E1 and when this gap E1x includes the center position in the X-direction of the edge line depicting the leading edge E1.

Although not shown in the drawings, the original 100 to be scanned may be an unbound document rather than a bound document like the book in FIG. 1. The original may be a single sheet of paper, for example. In such a case, the leading edge E1 will not include a gap. Thus, the processor 811 can determine on the basis of the presence of a gap in S140 whether the original 100 read by the reading device 900 is a bound document, such as a book document, that has been spread open.

When determining that the leading edge E1 does not include a gap in the center portion (S140: NO), in S150 the processor 811 generates scanned image data representing the entire original 100. Specifically, the processor 811 repeatedly reads line images with the image sensor 920 while moving the image sensor 920 in the scanning direction Dp1 so as to generate a plurality of sets of line image data for a plurality of lines. Subsequently, the processor 811 generates one page worth of scanned image data representing the scanned image IMa for the entire original 100 from the plurality of sets of line image data. The processor 811 may also execute a trimming process to remove the background region BG from the scanned image IMa. In S150 the processor 811 also stores the scanned image data in the storage 815 (the nonvolatile storage 813, for example) and subsequently ends the reading process.

On the other hand, when the processor 811 determines in S140 that the leading edge E1 includes a gap in its center portion (S140: YES), in S160 the processor 811 identifies the density distribution in the line image L1 shown in FIG. 5(A). The leading-edge line image L1 is a line image representing the leading edge E1 and will be called the leading-edge line image L1 hereafter. In the embodiment, the processor 811 uses the luminance value for each pixel as an index representing density. When the color values for each pixel in the line image data specify RGB component values, the processor 811 calculates the luminance value using a prescribed relational expression for RGB component values and luminance values (for example, an equation to convert colors from the RGB color space to the YCbCr color space).

Figure 6A:
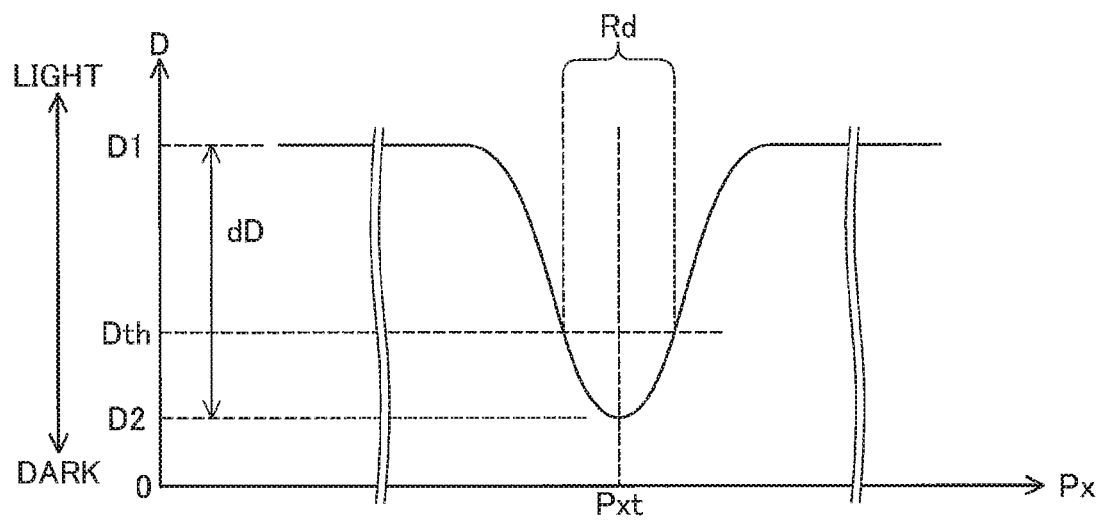
FIGS. 6(A) and 6(B) are graphs illustrating density distributions in line images.

FIG. 6(A) is a graph showing a sample density distribution in a line image. The horizontal axis represents a position Px in the X-direction, and the vertical axis represents a luminance value D. The smaller the luminance value D, the darker the color, i.e., the higher the density. As shown in the graph, the luminance value D is smaller at positions Px within the dark region Rd and larger at positions Px outside the dark region Rd.

In S170 of FIG. 2, the processor 811 identifies the dark region Rd in the leading-edge line image L1 (see FIG. 5(A)). In the embodiment, the processor 811 adopts a continuous range of positions Px whose luminance value D is less than or equal to a threshold Dth and that include a centerline Pxt of the original 100 as the range of the dark region Rd. Here, a luminance value D less than or equal to the threshold Dth signifies a density greater than or equal to a threshold value corresponding to the threshold Dth. The centerline Pxt is a line parallel to the Y-direction that passes through a center position between the downstream edge of the original 100 in the X-direction (the right edge Er in this example) and the upstream edge in the X-direction (the left edge E1 in this example). In the embodiment, the processor 811 identifies a downstream end point E1a and an upstream end point E1b. Here, each of the downstream end point E1a and the upstream end point E1b is an end point in the X-direction of an edge line corresponding to the leading edge E1 of the original 100 (see FIG. 5(A)) detected in S125. Subsequently, the processor 811 adopts the line parallel to the Y-direction that passes through the center point between the end points E1a and E1b as the centerline Pxt.

In the embodiment, the threshold Dth is set for each line image as follows. For portions of the original 100 (see FIG. 1) that are not separated from the support surface Us but remain in contact therewith (and particularly portions in the original 100 specifying the background rather than objects), the luminance value D is substantially constant. A first value D1 in FIG. 6(A) specifies a luminance value D of this type. A second value D2 in FIG. 6(A) denotes the minimum value in the valley portion of the graph line for the luminance value D that includes the centerline Pxt. A luminance difference dD denotes the difference between the first value D1 and the second value D2. The threshold Dth is set to a value obtained by multiplying the luminance difference dD by a prescribed coefficient (0.8, for example). The threshold Dth may also be a preset value.

The first value D1 may be identified according to any of various methods used to identify the luminance value D in areas specifying the background in an original. For example, if partial regions in a line image is included in a region representing the original 100 and includes the third edge E3 or the fourth edge E4, such partial regions are regions indicating an edge of the original 100. There is a high probability that a partial region including an edge of the original 100 will not include an object such as text. Therefore, the average of luminance values D in such partial regions may be used as the first value D1.

In S180 the processor 811 identifies a distance X1 concerning the size of the dark region Rd. As shown in FIG. 5(A), the distance X1 is the distance between the centerline Pxt of the original 100 and an edge Rde of the dark region Rd. The edge Rde is positioned at upstream side of the center line Pxt in the X-direction and where the luminance value D is equal to the threshold Dth. The distance X1 is approximately half the width of the dark region Rd. Thus, the distance X1 serves as an index representing the magnitude of width of the dark region Rd. In the embodiment, the distance from the centerline Pxt to an upstream point in the X-direction is used as the distance X1. The distance X1 is for indicating the range of the dark region Rd in the leading-edge line image L1.

In S190 the processor 811 identifies a width W of the original 100. As shown in FIG. 5(A), the width W is the distance in the X-direction between the upstream edge of the original 100 in the X-direction (the left edge E1 in this case) and the downstream edge of the original 100 in the X-direction (the right edge Er in this case). The processor 811 calculates this width W by analyzing the leading-edge line image L1 to find the distance between the end points E1a and E1b of the edge line corresponding to the leading edge E1.

In S200 the processor 811 identifies a reference line position Pys. As shown in FIG. 5(A), the reference line position Pys indicates a position separated a distance Ys in the Y-direction from the leading-edge line image L1. In other words, the reference line position Pys is a position separated the distance Ys in the Y-direction from the leading edge E1 of the original 100. The distance Ys is set using the width W of the original 100. In the embodiment, the distance Ys is obtained by multiplying the width W by a prescribed coefficient that is less than 1 (0.5, for example).

In S210 the processor 811 controls the image sensor 920 to read line images for a prescribed number Q of lines (where the number Q is an integer of 1 or greater, such as 10). Specifically, the processor 811 moves the image sensor 920 in the scanning direction Dp1 a distance equivalent to the width of one line, controls the image sensor 920 to read a line image at the new position, and repeats this process Q times. At this time, the image sensor 920 may be moved continuously a distance equivalent to Q lines, and the processor 811 may control the image sensor 920 to read line images as the image sensor 920 is moving in the scanning direction Dp1.

In S220 the processor 811 detects edges of the original 100 by analyzing the line images acquired above. This process is identical to the process in S120.

In S225 the processor 811 searches the trailing edge E2 of the original 100. The trailing edge E2 may be detected according to any of various processes capable of detecting the trailing edge E2. In the embodiment, the processor 811 detects the upstream edge E3 of the original 100 in the X-direction, and the downstream edge E4 of the original 100 in the X-direction (see FIG. 5(A)). The upstream edge E3 in the X-direction is substantially parallel to the Y-direction and is represented by an edge line extending in the Y-direction from the upstream end point E1b of the edge line in the X-direction on the leading edge E1. The downstream edge E4 in the X-direction is substantially parallel to the Y-direction and is indicated by an edge line extending in the Y-direction from the downstream end point E1a of the edge line in the X-direction on the leading edge E1. Next, the processor 811 searches an edge line substantially parallel to the X-direction that connects downstream end points E3e and E4e in the Y-direction on the corresponding edge E3 and edge E4. If the edge line is found, the processor 811 uses this edge line to indicate the trailing edge E2. Note that the processor 811 will not detect the trailing edge E2 when the position of the target line image has not yet reached the trailing edge E2.

In S230 the processor 811 determines whether the trailing edge E2 (and specifically an edge line specifying the trailing edge E2 in this case) has been detected. When the trailing edge E2 has been detected (S230: YES), in S240 the processor 811 uses the plurality of sets of line image data read for the plurality of lines to generate scanned image data representing the entire original 100. In S240 the processor 811 also stores the scanned image data in the storage 815 (the nonvolatile storage 813, for example). Subsequently, the processor 811 ends the reading process.

However, if the trailing edge E2 has not been detected (S230: NO), in S300 of FIG. 3 the processor 811 identifies the density distribution in the target line image. The density distribution is identified according to the same process described in S160 (see FIG. 2). Here, the target line image is the line image last read by the image sensor 920. Hence, the target line image is the line image positioned farthest in the Y-direction among all line images that have been read.

In S310 the processor 811 identifies the dark region Rd in the target line image. This process is identical to S170 in FIG. 2. In S320 the processor 811 identifies a distance Xc concerning a size of the target line image. FIG. 5(A) shows an example of the distance Xc in the target line image Lc. The distance Xc is identified according to the same method used to identify the distance X1 in S180. In other words, the distance Xc is approximately half the width of the dark region Rd in the target line image Lc. Thus, the distance Xc is an index indicating the magnitude of width of the dark region Rd. The distance Xc also indicates the range of the dark region Rd in the target line image Lc.

In S330 the processor 811 identifies a maximum density difference Dmax between the previous target line image and the current target line image. As will be described later, the process between S210 (FIG. 2) and S330 (FIG. 3) is repeated a plurality of times. The current target line image is the latest target line image. The previous target line image is the target line image used the last time the process in S210-S330 was executed. By performing the process in S210-S330 one time, line images for Q lines are read (S210). Consequently, the previous target line image is positioned apart from the current target line image by Q lines toward upstream side in the Y-direction. When the process in S210-S330 is executed the first time, the leading-edge line image L1 (see FIG. 5(A)) is used as the previous target line image. In the following description, the first line image Lp in FIG. 5(A) will be treated as the previous target line image, and the second line image Lc will be treated as the current target line image.

Figure 6B:
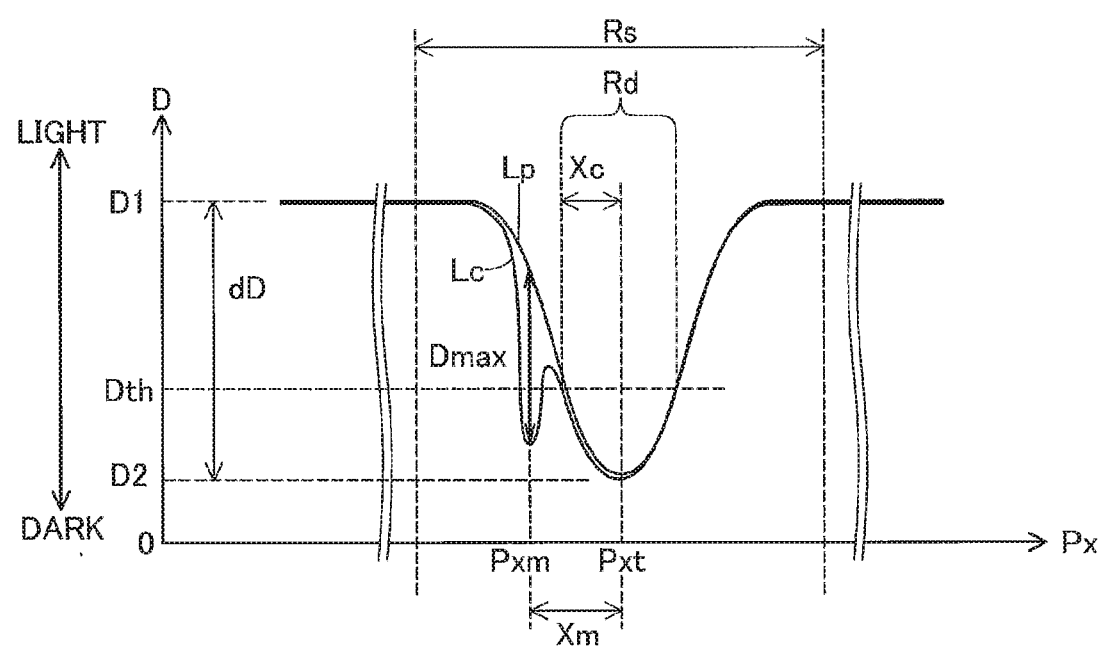

FIG. 6(B) is a graph showing a sample density distribution in a line image. The horizontal axis represents the position Px in the X-direction, and the vertical axis represents the luminance value D. Lines in this graph are designated with the same reference numerals as their corresponding line images. For example, the line designated by reference numeral Lp indicates the luminance value D for the previous target line image Lp, while the line designated by reference numeral Lc indicates the luminance value D for the current target line image Lc. As in the graph of FIG. 6(A), the line for the previous target line image Lp depicts a smooth valley that corresponds to a dark region.

As shown in FIG. 5(A), a character string TXT is positioned on the current target line image Lc near the dark region Rd. As indicated by the graph line in FIG. 6(B) for the current target line image Lc, the luminance value D becomes small at a position Pxm of the character string TXT in addition to the dark region Rd.

The processor 811 calculates a maximum value Dmax of the difference in luminance values D at the same position Px between the previous target line image and the current target line image. This maximum value Dmax indicates the maximum difference in density, i.e., a maximum density difference (hereinafter called the "maximum density difference Dmax"). In the example of FIG. 6(B), the difference in luminance values D is largest at the position Pxm denoting a character in the current target line image. In general, when the maximum density difference Dmax is large, the position Pxm of the maximum density difference Dmax indicates that a character string TXT or other object exists on the current target line image and the character string TXT is not present in the previous target line image. When the line images Lp and Lc do not specify an object, the maximum density difference Dmax is a small value approaching zero.

In the embodiment, the processor 811 identifies the maximum density difference Dmax from a partial region Rs that includes the dark region Rd (see FIG. 6(B)). FIG. 6(B) shows a range Rs used for identifying the maximum density difference Dmax. The range Rs is a range centered on the centerline Pxt. The maximum density difference Dmax is the largest difference in luminance values D found within the range Rs. The range Rs may be a preset large range. Alternatively, the range Rs may be set for each line image. For example, the size of the range Rs may be a value obtained by multiplying the distance Xc by a prescribed coefficient larger than one (6, for example). In any case, the range Rs is preferably set to be wider than the width of the dark region Rd and to include the entire dark region Rd.

In S340 the processor 811 determines whether the maximum density difference Dmax is greater than a density difference threshold Dmth. The density difference threshold Dmth is set in advance through experimentation so as to be capable of differentiating a large maximum density difference Dmax and a small maximum density difference Dmax. Here, the large maximum density difference Dmax is attributed to a character or other object, and the small maximum density difference Dmax is obtained in cases where neither the line images Lp nor Lc indicates an object.

When the maximum density difference Dmax is less than or equal to the density difference threshold Dmth (S340: NO), the processor 811 returns to S210 of FIG. 2 and executes the above process on a new line image.

When the maximum density difference Dmax exceeds the density difference threshold Dmth (S340: YES), in S350 the processor 811 identifies a significant-difference position Pxm indicating the position Px that corresponds to the maximum density difference Dmax in the current target line image. In S360 the processor 811 determines whether the significant-difference position Pxm falls within the dark region Rd at the current target line image Lc. In the embodiment, the processor 811 calculates a distance Xm in the X-direction between the significant-difference position Pxm and the centerline Pxt (see FIG. 5(A)). The processor 811 determines that the significant-difference position Pxm falls within the dark region Rd when the distance Xm for the significant-difference position Pxm is less than or equal to the distance Xc for the dark region Rd.

A significant-difference position Pxm that falls in the dark region Rd indicates that a character string TXT or other object is present in the dark region Rd. When an object is positioned in the dark region Rd, the difference in density between the object and the background is smaller because both the object and background are rendered in dark colors. Consequently, the object is difficult to visually recognize. In order to make the object easier to recognize, it is preferable to adjust the placement of the original 100 on the support surface Us so that the dark region Rd is reduced in size.

If the significant-difference position Pxm falls inside the dark region Rd in the embodiment (S360: YES), in S410 of FIG. 4 the processor 811 interrupts the reading operation of the reading device 900 for reading the original 100. Specifically, the processor 811 controls the image sensor 920 to suspend reading and controls the moving device 930 to suspend movement of the image sensor 920.

In S420 the processor 811 displays information (a message, for example) on the display 840 indicating that reading of the original was interrupted. After reading the display on the display 840, the user can recognize that the reading operation has been interrupted. At this time, the user can adjust the placement of the original 100 on the support platen 894 (see FIG. 1) to reduce the size of the dark region Rd.

In S430 the processor 811 receives a user command inputted on the operation interface 850. The user may input a command on the operation interface 850 to rescan the original after adjusting the placement of the original 100 on the support platen 894. When a rescan command has been inputted (S440: YES), the controller 810 returns to S100 of FIG. 2 and re-executes the scanning process from the beginning. Accordingly, the reading device 900 begins reading the original 100 from the leading edge E1 side.

If a rescan command is not inputted (S440: NO), the processor 811 ends the reading process without generating any scanned image data. Note that various conditions may be established to determine when a rescan command has not been inputted. For example, the condition may require that a prescribed time has elapsed after the reading operation was cancelled without a rescan command having been inputted. As an alternative, the processor 811 may display a selection screen on the display 840 prompting the user to input a command to perform a rescan or a command to end the scanning operation. When a command for ending the scanning operation has been inputted, the processor 811 may end the reading process without generating any scanned image data.

On the other hand, if the processor 811 determines in S360 of FIG. 3 that the significant-difference position Pxm does not fall within the dark region Rd of the current target line image Lc (S360: NO), in S370 the processor 811 determines whether the reference line position Pys identified in S200 of FIG. 2 is a position on the downstream side of the current target line image Lc (i.e., on the side in the Y-direction corresponding to the scanning direction Dp1). If the reference line position Pys is positioned on the upstream side (the side in the direction opposite the Y-direction) of the current target line image Lc (S370: NO), the processor 811 returns to S210 in FIG. 2 and executes the above process on a new line image.

However, if the reference line position Pys (see the example in FIG. 5(A)) is positioned on the downstream side of the current target line image Lc (S370: YES), in S380 the processor 811 calculates a slope dX for the edge Rde of the dark region Rd. The slope dX denotes the rate of change in the position of the edge Rde in the X-direction to change in the position of the edge Rde in the Y-direction and is calculated according to the following equation.

$$dX=(Xc-X1)/Yc$$

Here, as shown in FIG. 5(A), a distance Yc denotes the distance in the Y-direction between the leading-edge line image L1 and the current target line image Lc.

In S390 the processor 811 uses this slope dX to calculate a distance Xs within the dark region Rd of the line image Ls at the reference line position Pys (hereinafter called the "reference line image Ls"). The distance Xs is the distance between the centerline Pxt and the edge Rde of the dark region Rd in the reference line image Ls. The distance Xs is calculated according to the following equation.

$$Xs=X1+dX*Ys \text{ (where * denotes the multiplication symbol)}$$

Note that the reference line image Ls has not yet been read. The distance Xs is an estimated value specifying the range of the dark region Rd at the reference line image Ls.

In S400 the processor 811 determines whether the significant-difference position Pxm (see FIG. 5(A)) falls within the dark region Rd in the reference line image Ls. In the embodiment, the processor 811 determines that the significant-difference position Pxm is within the dark region Rd when the distance Xm of the significant-difference position Pxm is less than or equal to the distance Xs in the dark region Rd.

If a character string TXT or other object is present at the significant-difference position Pxm at the distance Xm in the current target line image Lc, there is a high probability that an object is present at the significant-difference position Pxm at the same distance Xm from the centerline Pxt in the reference line image Ls. When the distance Xm of the significant-difference position Pxm is less than or equal to the distance Xs of the dark region Rd, there is a high probability that an object is positioned in the dark region Rd of the reference line image Ls. As described in S360 of FIG. 3, an object positioned in the dark region Rd is difficult to recognize visually. Therefore, when the determination result of S400 is YES, as when there is a YES determination result in S360, the processor 811 advances to S410 of FIG. 4 and interrupts the image reading operation.

Here, the width of the dark region Rd changes almost linearly in response to changes in position in the Y-direction. Therefore, by determining whether an object is present in the dark region Rd of the reference line image Ls, the processor 811 can determine whether an object is located in the portion of the dark region Rd from the current target line image Lc to the reference line image Ls.

If the processor 811 determines in S400 of FIG. 3 that the significant-difference position Pxm is not inside the dark region Rd at the reference line image Ls (S400: NO), the processor 811 returns to S210 of FIG. 2 and executes the above process on a new line image.

As described above in the embodiment, the processor 811 determines in S140 of FIG. 2 whether the original 100 read by the reading device 900 is a book document, i.e., a bound document that has been spread open. When determining that the original is a book document (S140: YES), in S300-S330 of FIG. 3 the processor 811 calculates the maximum density difference Dmax between the density distribution in the current target line image and the density distribution in the previous target line image. Here, the target line image is a region of the image read by the reading device 900 that extends in a direction orthogonal to the extending direction Dx and that includes a portion of the dark region Rd which is a high density region extending in the extending direction Dx. Thus, the position in the extending direction Dx differs between the current target line image and the previous target line image.

If it is determined, using the maximum density difference Dmax, that the following conditions 1 and 2 are met, the processor 811 suspends the operation performed by the reading device 900 to read the plurality of line images.
Condition 1: determination result in S340 is YES
Condition 2: determination result in S360 is YES, or determination results in S370 and S400 are YES If either one of conditions 1 and 2 is not met, the processor 811 controls the reading device 900 to proceed with the reading of line images.

In this way, the maximum density difference Dmax of the density distribution is used to determine whether conditions 1 and 2 have been met in order to decide whether to proceed with the reading of line images. Hence, this process can restrict the reading of images that depict information of the original (text, for example) inaccurately in the region that includes the gutter of the original 100 (i.e., the bound region).

Further, the reading of line images can be suspended prior to reading the entire original 100. Hence, this method can reduce the time required for reading an original 100 when the process must be started over.

Further, through S125-S130 of FIG. 2, the processor 811 identifies an edge line read by the reading device 900 that corresponds to the leading edge E1 defining the image of the original 100. In S140 the processor 811 determines whether the edge line corresponding to the leading edge E1 includes a gap in its center portion. When the edge line for the leading edge E1 includes a gap (S140: YES), the processor 811 determines that the original 100 is a book document and executes a process using the dark region Rd denoting the bound portion. Specifically, by repeating step S300 in FIG. 3, the processor 811 identifies the density distribution in the previous target line image and the density distribution in the current target line image. In S330 the processor 811 identifies the maximum density difference Dmax denoting the maximum value of the difference in density between the previous target line image and the current target line image at the same position Px in a direction parallel to the line image. Specifically, for each position in the X-direction, the process 811 obtains a difference in density between the previous target line image and the current target line image, and identifies a maximum difference among the obtained differences as the maximum density difference Dmax. In S340 the processor 811 determines whether the maximum density difference Dmax exceeds the density difference threshold Dmth. In S350 the processor 811 identifies the significant-difference position Pxm as the position in a direction parallel to the line image that corresponds to a maximum density difference Dmax determined to have exceeded the density difference threshold Dmth.

Subsequently in S370, the processor 811 confirms that the reference line image Ls will be read after the current target line image (S370: YES). In S380-S390, the processor 811 estimates the range of the dark region Rd (the distance Xs in this case) in the reference line image Ls. In S400 the processor 811 determines that condition 2 has been met when the same significant-difference position Pxm falls within the range of the dark region Rd of the reference line image Ls (S400: YES). Thus, when an object (a character string TXT, for example) may be present in the dark region Rd of the reference line image Ls, it is determined that the condition for interrupting the reading of line images has been met, thereby restricting the reading of images that inappropriately represent information in the original.

In S170 and S180 of FIG. 2, the processor 811 identifies the range of the dark region Rd (specifically, the distance X1) in the leading-edge line image L1 that includes the leading edge E1 of the original 100. In S310 and S320 of FIG. 3, the processor 811 identifies the range of the dark region Rd (specifically, the distance Xc) in the current target line image Lc. In S360-S390 the processor 811 identifies the distance Xs of the dark region Rd in the reference line image through extrapolation based on the distance X1 in the dark region Rd of the leading-edge line image L1, the distance Xc in the dark region Rd of the current target line image Lc, the distance Yc between the leading-edge line image L1 and current target line image Lc, and the distance Ys between the leading-edge line image L1 and reference line image Ls. In S400 the processor 811 uses the identified distance Xs to determine whether the significant-difference position Pxm in the reference line image Ls falls within the range of the dark region Rd at the reference line image Ls. Specifically, the processor 811 determines that the significant-difference position Pxm is within the dark region Rd when the distance Xm of the significant-difference position Pxm is less than or equal to the distance Xs of the dark region Rd. Since the range of the dark region Rd on the reference line image Ls can be identified through extrapolation in this way, the processor 811 can suitably determine whether to proceed with reading of the original image prior to reading the reference line image Ls according to a condition based on the estimated range of the dark region Rd at the reference line image Ls.

In S190 of FIG. 2, the processor 811 identifies the width W of the original 100 by analyzing the reading results of the reading device 900 (the leading-edge line image L1 in this case). In S200 the processor 811 adopts the position separated from the leading edge E1 of the original 100 by a distance Ys, obtained by multiplying the width W by a coefficient less than 1, as the reference line position Pys of the reference line image Ls. This method can restrict the reading of images representing information of the original inaccurately, even when reading an original of a size different from a standard size. Here, the user may also set the coefficient to be multiplied by the width W.

As described with reference to FIG. 1, the image-reading apparatus 800 is provided with the display 840 and the operation interface 850. In S420 of FIG. 4, the processor 811 displays on the display 840 information indicating the interruption of a reading process when the operation for reading an image by the reading device 900 has been interrupted. If the user inputs a command on the operation interface 850 to rescan the original (S440: YES), the processor 811 returns to S100 of FIG. 2 and begins reading the original 100 with the reading device 900 starting from the leading edge E1 side. Thus, when information indicating that a scan has been interrupted is displayed on the display 840, the user can adjust the placement of the original on the support platen 894 and input a command to rescan the original through an operation on the operation interface 850. In this case, the reading device 900 re-reads the original from the beginning. As a result, an image that properly represents the information in the original can be read.

B. Second Embodiment

Figure 7:
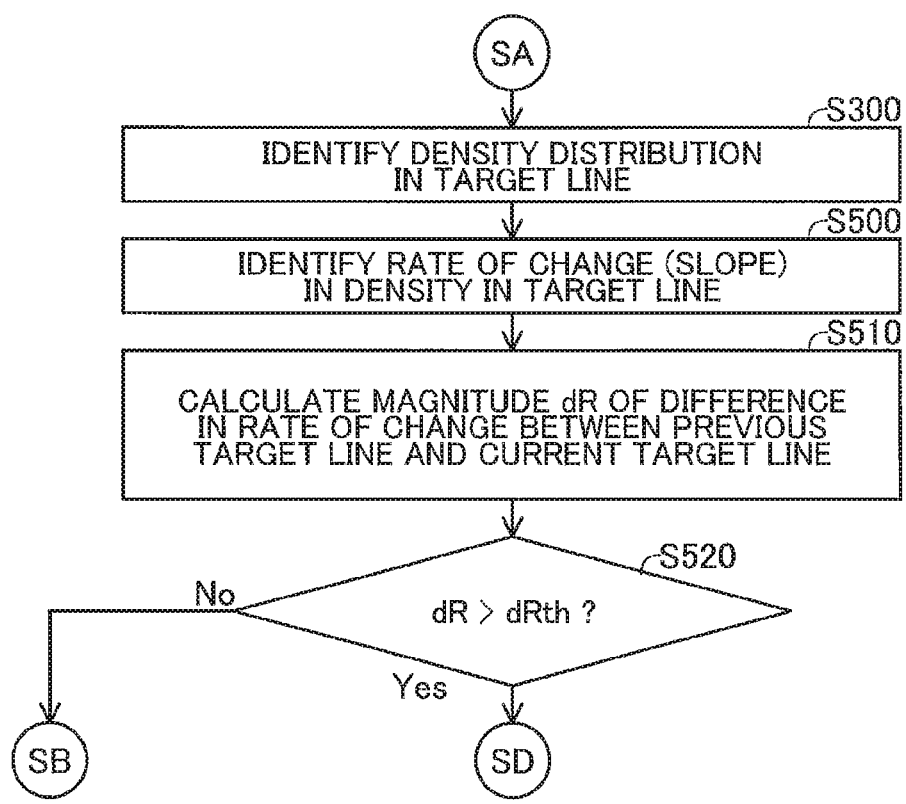
FIG. 7 is a flowchart illustrating a part of a reading process according to a second embodiment.

FIG. 7 is a flowchart illustrating steps in a reading process according to a second embodiment of the present disclosure. The reading process in the second embodiment is identical to that in the first embodiment described in FIGS. 2 through 4, provided that the section of FIG. 3 is replaced by the description shown in FIG. 7. As in the process of FIG. 3 in the first embodiment, the process in FIG. 7 uses the current target line image and the previous target line image to determine whether to cancel reading of the original 100. However, the process in FIG. 7 differs from the first embodiment in FIG. 3 in that the slope of the line representing density distribution is used in place of the significant-difference position Pxm of the maximum density difference Dmax for this determination. Steps in FIG. 7 that are identical to those in FIG. 3 are designated with the same step numbers to avoid duplicating description.

When the processor 811 does not detect the trailing edge of the original 100 in S230 of FIG. 2 (S230: NO), in S300 of FIG. 7 the processor 811 identifies the density distribution in the target line image. The process in S300 is identical to that in S300 of FIG. 3.

FIG. 8(A) shows examples of target line images in the scanned image IMa. FIGS. 8(B) through 8(E) show sample lines of density distribution. FIG. 8(A) illustrates the same portion of the scanned image IMa shown in FIG. 5(A) (and particularly the part that includes the dark region Rd). FIG. 8(A) indicates four pairs LP1-LP4 of line images, with each pair including a current target line image and a previous target line image. Specifically, the pairs LP1-LP4 represent respective combinations of current target line images Lt1, Lt2, Lt3, and Lt4 and previous target line images Lt1$p$, Lt2$p$, Lt3$p$, and Lt4$p$. The pairs LP1-LP4 are arranged in sequence in the Y-direction. The four graph lines in FIGS. 8(B)-8(E) depict the density distribution of the four pairs LP1-LP4, respectively. The horizontal axis represents the position Px in the X-direction, and the vertical axis represents the luminance value D.

As shown in FIG. 8(A), the width of the dark region Rd gradually increases in the Y-direction. The distance in the Y-direction between the dark region Rd and the nearest character string TXT gradually decreases. The line representing each of line images Lt1, Lt1$p$, Lt2, and Lt2$p$ in FIGS. 8(B) and 8(C) depicts a smooth valley representing the dark region. The line representing each of line images Lt3 and Lt3$p$ in FIG. 8(D) depicts one valley representing the dark region, and one narrow valley representing a character string TXT. The line representing each of line images Lt4 and Lt4$p$ in FIG. 8(E) depicts a wide valley. This wide valley is a single valley formed through the merging of a valley representing a dark region and a narrow valley representing a character string TXT.

As described above, the current target line image and the previous target line image differ in position in the Y-direction. When a character is positioned in the vicinity of a dark region, the portion of the character included in the target line image may differ in shape between the current target line image and the previous target line image. For example, the upper half of a character "A" may be contained in the previous target line image while the lower half of the same character may be contained in the current target line image. Further, the position Px of the character may differ between the current target line image and the previous target line image. Because of the above described differences, if a character is positioned in the vicinity of the dark region, the shape of the density distribution may differ between the current target line image and the previous target line image. For example, the slope of the graph line in the area representing the valley may differ, as shown in FIG. 8(E).

In S500 of FIG. 7, the processor 811 identifies the rate of change in density in the target line image. The rate of change is the slope of a line illustrated in each of FIGS. 8(B) through 8(E) and indicates the rate of change in the luminance value D (i.e., the change in density) to change in the position Px. In the embodiment, the processor 811 calculates the slope in the line representing the luminance value D at which the luminance value D is equivalent to a reference value Ds. Straight lines Rt1, Rt1$p$, Rt2, Rt2$p$, Rt3, Rt3$p$, Rt4, and Rt4$p$ represented by dashed lines in FIGS. 8(B) through 8(E) indicate the respective slopes of lines for line images Lt1, Lt1$p$, Lt2, Lt2$p$, Lt3, Lt3$p$, Lt4, and Lt4$p$. These slopes indicate the rate of change in density to change in position between a high-density dark region (i.e., a region in which the luminance value D is smaller than the reference value Ds) and a low-density light region (i.e., a region in which the luminance value D is greater than the reference value Ds).

Any of various methods may be used to calculate the slope. For example, when a pixel having a luminance value D that exceeds the reference value Ds and a pixel having a luminance value D less than the reference value Ds are adjacent to each other in the line image in the X-direction, the difference in luminance value D between these pixels may be treated as the slope. The reference value Ds is predetermined in the embodiment, but may be set for each line image. As with the threshold Dth described in FIG. 6(A), the reference value Ds may be set to a value obtained by multiplying the luminance difference dD by a prescribed coefficient (0.8, for example).

Note that the line representing the luminance value D may include a plurality of parts at which the luminance value D is equivalent to the reference value Ds, as in the example of FIG. 8(D). In the embodiment, the processor 811 takes the slope for the part that is closest to the centerline Pxt on the upstream side of the centerline Pxt in the X-direction.

In S510 of FIG. 7, the processor 811 calculates a magnitude dR of the difference (i.e., the absolute value of the difference) between the rate of change in the previous target line image and the rate of change in the current target line image. In S520 the processor 811 determines whether the magnitude dR of the difference exceeds a rate threshold dRth.

As shown in FIGS. 8(B) through 8(D), the magnitude dR for the difference between the current and previous rates of change is smaller when the distance between the character and the dark region Rd is relatively large. On the other hand, when the distance between the character and the dark region Rd is relatively small, as in the example of FIG. 8(E), the magnitude dR for the difference between the current and previous rates of change is large. Thus, a magnitude dR exceeding the rate threshold dRth indicates a high probability that a character or other object is present in the dark region Rd. Note that the rate threshold dRth is predetermined through experimentation to ensure an accurate determination. Alternatively, the processor 811 may set the rate threshold dRth using results of analyzing images read by the reading device 900. For example, the processor 811 may set the rate threshold dRth to a value obtained by multiplying the rate of change in density in the leading-edge line image L1 by a prescribed coefficient. Alternatively, the user may set the rate threshold dRth.

If the magnitude dR of difference exceeds the rate threshold dRth (S520: YES), the processor 811 advances to S410 of FIG. 4 and executes the process in S410-S440 for interrupting the reading operation. If the magnitude dR of the difference is less than or equal to the rate threshold dRth (S520: NO), the processor 811 returns to S210 of FIG. 2 and executes the above process on a new line image.

In the second embodiment described above, the processor 811 repeatedly executes the process in S300 of FIG. 7 to identify the density distribution of the previous target line image and the density distribution of the current target line image. The processor 811 repeats the process in S500 to identify the rate of change in density in the previous target line image and the rate of change in density in the current target line image. In S510 the processor 811 calculates the magnitude dR of the difference in the current and previous rates of change. When the processor 811 determines in S520 that the magnitude dR of the difference in rates of change exceeds the rate threshold dRth, the processor 811 determines that the condition for interrupting the reading of line images has been met. Thus, when an object (a character string TXT, for example) is included in the dark region of the current target line image, the processor 811 can determine that the condition for suspending the reading of line images has been met, thereby restricting the reading of images that inaccurately represent information in the original.

C. Third Embodiment

Figure 9:
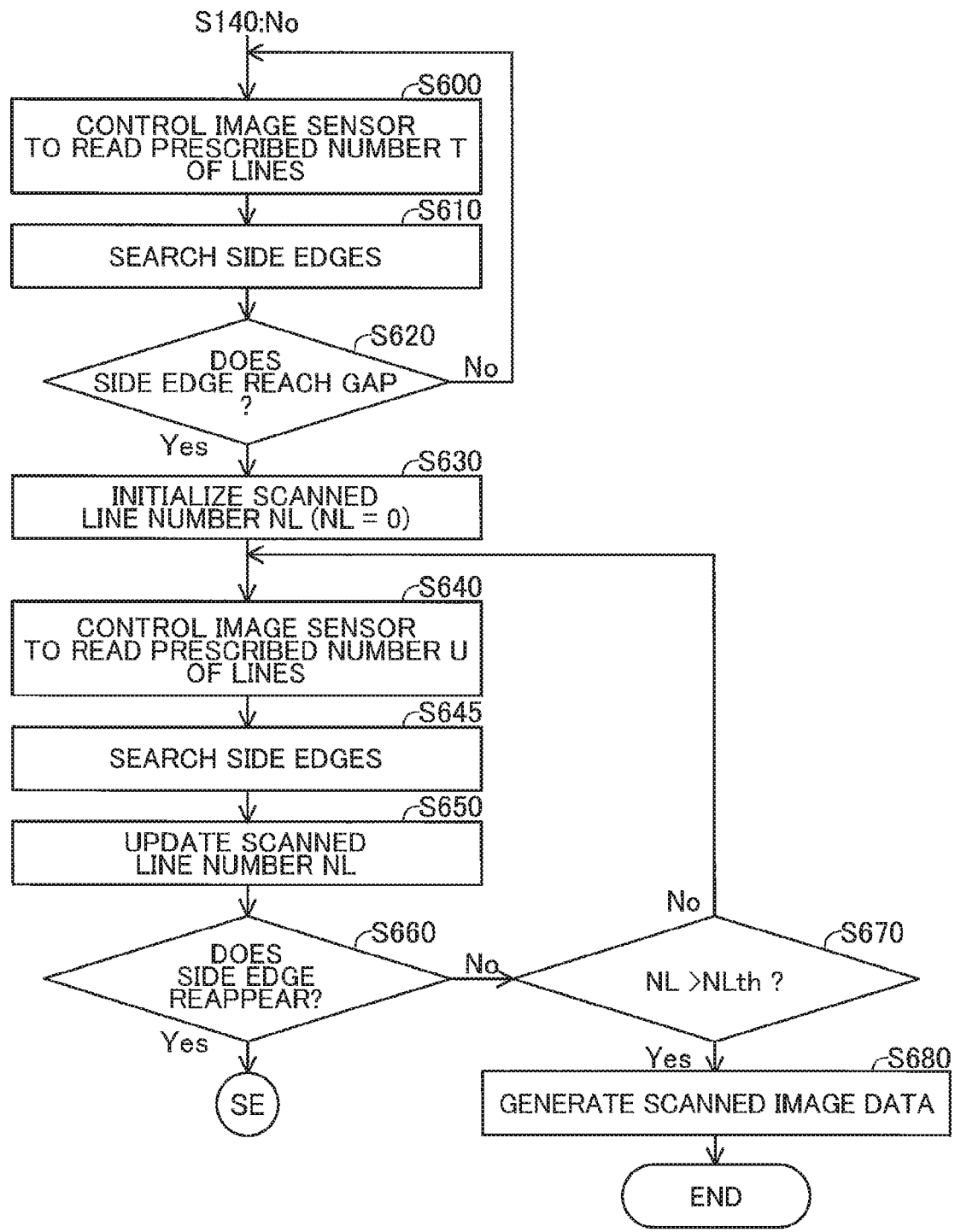
FIG. 9 is a flowchart illustrating a part of a reading process according to a third embodiment.
Figure 10:
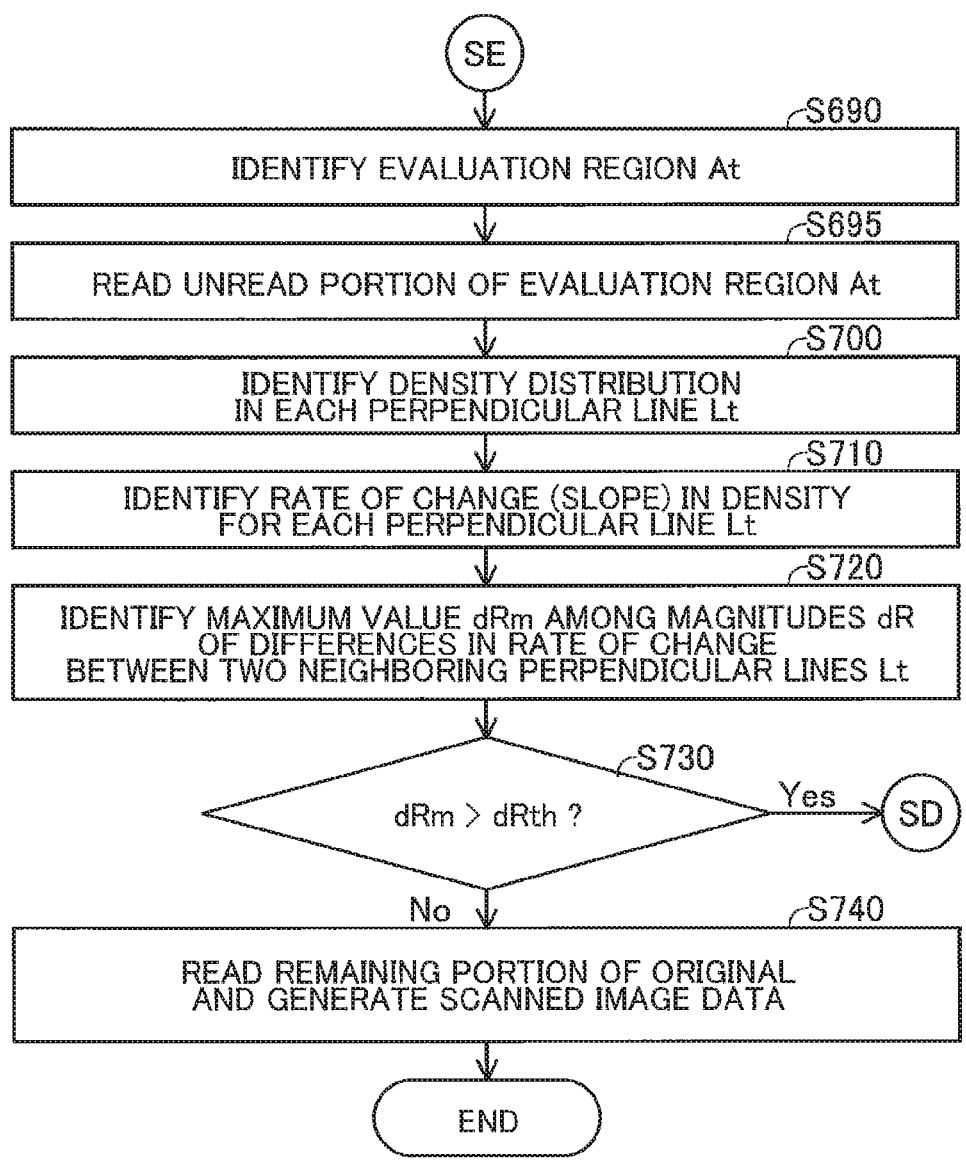
FIG. 10 is a flowchart illustrating a part of the reading process continuing from the flowchart shown in FIG. 9.

FIGS. 9 and 10 are flowcharts illustrating steps in a reading process according to a third embodiment of the present disclosure. The process in FIGS. 9 and 10 is executed in place of S150 of FIG. 2. The process in FIGS. 9 and 10 may be applied to both the first and second embodiments described above.

Figure 11:
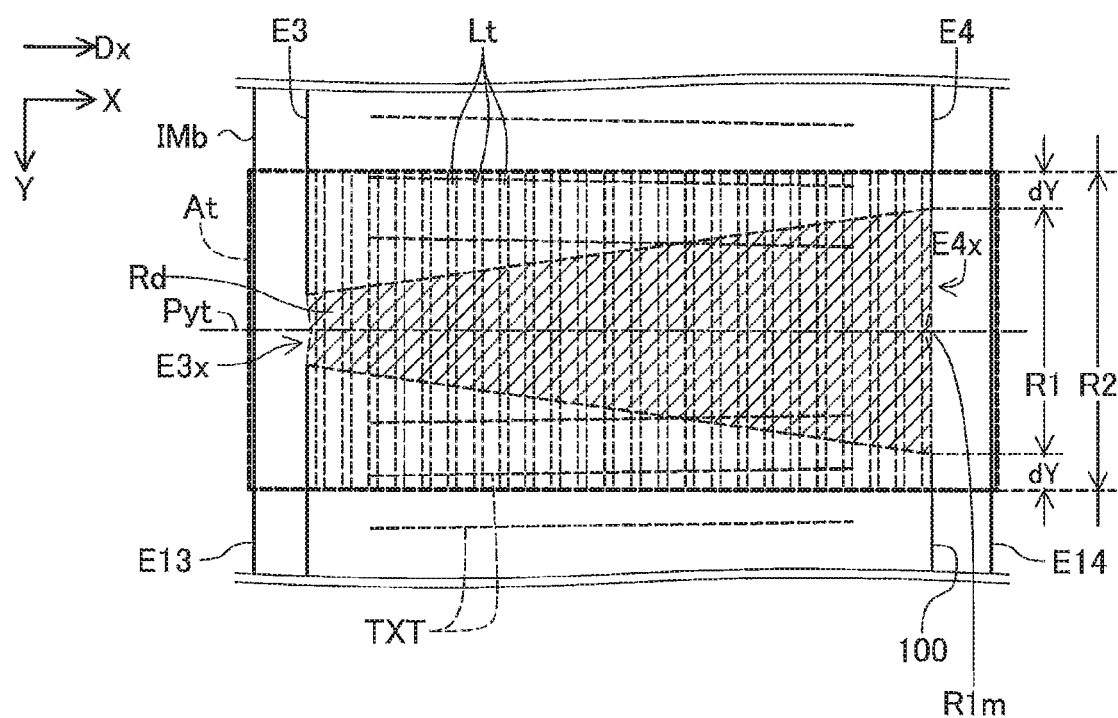
FIG. 11 is a schematic diagram illustrating an example of a scanned image according to the third embodiment.

FIG. 11 is a schematic diagram showing an example of a scanned image IMb. The scanned image IMb shown in FIG. 11 is generated when the original 100 is located on the platen 894 in a state where the original 100 is rotated 100 degrees from the state shown in the bottom view of FIG. 1. In the scanned image IMb, the top and bottom edges of the original 100 extends in the Y-direction.

Specifically, the diagram in FIG. 11 shows the portion of the scanned image IMb that includes the dark region Rd. The scanned image IMb shows an image scanned when the extending direction Dx of the dark region Rd in the original 100 (see FIG. 5(A)) is equivalent to the X-direction. When the extending direction Dx is equivalent to the X-direction, in S125 of FIG. 2 either the edge E3 or the edge E4 is detected as the leading edge of the original 100.

The left and right edges (not shown) of the original 100 extend in the X-direction. Since the edge lines corresponding to the right edge and left edge (not shown) do not include a gap in this case, the determination result in S140 of FIG. 2 is NO. Consequently, the process advances to S600 in FIG. 9.

In S600 the processor 811 controls the image sensor 920 to read a prescribed number T of line images (where the number T is an integer of 1 or greater, such as 10). The process in S600 is identical to that in S210 of FIG. 2.

In S610 the processor 811 searches edge lines corresponding to the side edges E3 and E4 of the original 100 (see FIG. 11) from the line images that were read. The processor 811 treats the edge line substantially parallel to the Y-direction that is nearest an upstream edge E13 of the scanned image IMb in the X-direction as the edge line corresponding to the upstream edge E3 in the X-direction. The processor 811 similarly treats the edge line substantially parallel to the Y-direction that is nearest a downstream edge E14 of the scanned image IMb in the X-direction as the edge line corresponding to the downstream edge E4 in the X-direction. Note that the processor 811 may use other methods to identify edge lines corresponding to the side edges E3 and E4.

As illustrated in FIG. 11, the edge lines for the side edges E3 and E4 have corresponding gaps E3x and E4x in areas bordering the dark region Rd. In S620 of FIG. 9, the processor 811 determines whether at least one of the edge lines corresponding to the side edges E3 and E4 has a gap. If the target line image has reached neither the gaps E3x nor E4x, the processor 811 reaches a NO determination in S620. The processor 811 repeats the process in S600-S620 until a gap is detected.

When the target line image has reached one of the gaps E3x and E4x, the processor 811 detects that at least one of the edge lines corresponding to the side edges E3 and E4 has a gap (S620: YES) and in S630 initializes a scanned line number NL to zero. The scanned line number NL specifies the number of lines scanned after a gap was detected.

In S640 the processor 811 controls the image sensor 920 to read a prescribed number U of line images (where the number U is an integer of 1 or greater, such as 10). In S645 the processor 811 searches edge lines corresponding to the side edges E3 and E4 of the original 100 (see FIG. 11) from the line images that have been read. The process in S640 and S645 is similar to that in S600 and S610. In S650 the processor 811 updates the scanned line number NL by adding the number U to the scanned line number NL.

When the target line image is positioned on a downstream side in the Y-direction of the gap E3x (see FIG. 11), the processor 811 searches an edge line that includes the gap E3x, similar to the edge line for the leading edge E1 in FIG. 5(B). In other words, the processor 811 detects that the edge line for the edge E3 has reappeared. The processor 811 similarly detects that the edge line for the edge E4 has reappeared when the current line becomes positioned on a downstream side in the Y-direction of the gap E4x.

In S660 the processor 811 determines whether the edge lines corresponding to the side edges E3 and E4 have reappeared following their gaps. When it is determined that the edge lines for both the side edge E3 and side edge E4 include corresponding gaps E3x and E4x, as illustrated in the scanned image IMb of FIG. 11, the processor 811 determines whether the discontinued edge line has reappeared when both edge lines for the two side edges E3 and E4 have reappeared.

When a NO determination result is reached in S660 of FIG. 9, in S670 the processor 811 determines whether the scanned line number NL exceeds a prescribed threshold NLth. When the scanned line number NL is less than or equal to the threshold NLth (S670: NO), the processor 811 returns to S640. In S640 the processor 811 reads a new line image and in S660 again determines whether the discontinued edge line has reappeared.

Although not shown in the drawings, the original being scanned may be an unbound document (a single sheet of paper, for example). In this case, the processor 811 can determine in S620 that there is a break in the edge lines corresponding to the side edges when reading the region of the original that includes the downstream edge in the Y-direction (the edge corresponding to the trailing edge E2 in FIG. 5(A), for example). While the edge lines corresponding to the side edges have not reappeared (S660: NO), the processor 811 proceeds with the reading of line images. Therefore, when the scanned line number NL exceeds the threshold NLth (S670: YES), in S680 of the embodiment the processor 811 suspends reading of the image and uses the plurality of sets of line image data read for the plurality of lines that includes an image from the upstream edge of the original in the Y-direction to the downstream edge in the Y-direction to generate scanned image data representing the entire original. Subsequently, the processor 811 ends the reading process. The process in S680 is identical to that in S240 of FIG. 2. The threshold NLth is preset through experimentation so that the entire dark region Rd of a normal size can be read while the determination result in S670 remains NO.

When a YES determination is reached in S660, in S690 of FIG. 10 the processor 811 identifies an evaluation region At. FIG. 11 shows an example of an evaluation region At. The evaluation region At is a partial region that includes the entire dark region Rd. In the embodiment, the evaluation region At is identified by a range in the Y-direction. The processor 811 identifies a range R1 in the Y-direction in which the gaps E3x and E4x detected in S600-S660 of FIG. 9 are distributed. The processor 811 sets an evaluation range R2 by expanding the range R1 a prescribed distance dY in both the Y-direction and the direction opposite the Y-direction. The evaluation region At is the portion of the scanned image IMb that is included within the evaluation range R2.

In S695 of FIG. 10, the processor 811 controls the reading device 900 to read the unread portion of the evaluation region At. This process is identical to the process in S600 of FIG. 9.

In S700 of FIG. 10, the processor 811 identifies a plurality of perpendicular line images Lt in the evaluation region At. As shown in FIG. 11, each perpendicular line image Lt is an image configured of a plurality of pixels aligned in the Y-direction. That is, each perpendicular line image Lt extends in the Y-direction. The perpendicular line images Lt are spaced at predetermined intervals in the X-direction. The perpendicular line images Lt are approximately perpendicular to the extending direction Dx of the dark region Rd. In the embodiment, the positions of the perpendicular line images Lt in the X-direction are preset.

The processor 811 identifies the density distribution in each perpendicular line image Lt. The identified density distribution indicates a correlation between density (the luminance value D in this example) and position in the Y-direction. This density distribution corresponds to the density distribution described with reference to FIGS. 8(B) through 8(E).

In S710 the processor 811 identifies the rate of change in density for each perpendicular line image Lt. The calculated rate of change is the same as the rate of change described in S500 of FIG. 7. As in the example of FIGS. 8(B)-8(E), the rate of change is calculated to be the slope of the part of the graph line representing luminance value D at which the luminance value D is equivalent to the reference value Ds. Specifically, in the third embodiment, the slope indicates the rate of change in the luminance value D (i.e., the change in density) to change in the position in the Y-direction. Similarly to the example of FIG. 8(D), the graph line representing luminance value D for a single perpendicular line image Lt may include a plurality of parts in which the luminance value D is equivalent to the reference value Ds. In the embodiment, the processor 811 adopts the slope that is closest to the centerline Pyt on a downstream side of the centerline Pyt of the original 100 (see FIG. 11) in the Y-direction. A line parallel to the X-direction and passing through a center point R1m of the range R1 is adopted as the centerline Pyt.

In S720 the processor 811 calculates the magnitude dR of difference in the rate of change between two neighboring perpendicular line images Lt. When the total number of perpendicular line images Lt is K (where K is an integer of 2 or greater), the processor 811 calculates K−1 magnitudes dR of difference from K−1 pairs of neighboring perpendicular line images Lt. Thereafter, the processor 811 identifies a maximum value dRm of the K−1 magnitudes dR.

In S730 the processor 811 determines whether the maximum value dRm exceeds the rate threshold dRth. As described with reference to FIGS. 8(B) through 8(E), there is a high probability that a character or other object is included in the dark region Rd when dRm>dRth. In this case (S730: YES), the processor 811 advances to S410 in FIG. 4 and executes the process in S410-S440 for interrupting the reading operation.

However, if the maximum value dRm is less than or equal to the rate threshold dRth (S730: NO), in S740 the processor 811 controls the reading device 900 to read the remaining portion of the original 100 and generates scanned image data for the scanned image IMb. The processor 811 stores the scanned image data in the storage 815 (the nonvolatile storage 813, for example). Subsequently, the processor 811 ends the reading process. As in S210-S240 of FIG. 2, in S740 the processor 811 suspends reading of the original 100 in response to detecting the trailing edge E2.

As described above, in S610 of FIG. 9 the processor 811 identifies edge lines corresponding to the side edges E3 and E4 of the original 100 read by the reading device 900. In S620 and S660 the processor 811 determines whether the edge lines identified for the side edges E3 and E4 include gaps. When the edge lines for the side edges E3 and E4 include gaps (S620: YES, S660: YES), the processor 811 determines that the original 100 is a book document and executes a process employing a dark region Rd denoting the bound portion. Specifically, through steps S620-S660 of FIG. 9 and S695 of FIG. 10, the processor 811 controls the reading device 900 to read the entire dark region Rd. Subsequently in S700 of FIG. 10 the processor 811 identifies the rate of change in density for each of a plurality of perpendicular line images Lt extending in a direction substantially perpendicular to the extending direction Dx of the dark region Rd and intersecting the dark region Rd. In S710-S730 the processor 811 finds the magnitude dR of difference in rates of change for each pair of perpendicular line images Lt, which are separated by a prescribed distance. The processor 811 determines that the condition for interrupting reading of line images has been met if the maximum value dRm of the magnitudes dR of difference is greater than the rate threshold dRth. With this configuration, the processor 811 can restrict the reading of images representing information in the original inaccurately, even when the bound portion of the book document is parallel to the plurality of line images, i.e., when the extending direction Dx of the dark region Rd is equivalent to the X-direction.

D. Variations of the Embodiments (1) Any of various processes may be used as the reading process in place of or in addition to the process described in the embodiments. For example, the processor 811 may perform skew correction on the scanned image. As an example, in S125 of FIG. 2, the processor 811 may perform skew correction so that the edge line corresponding to the leading edge E1 is parallel to the X-direction. The skew correction may be performed each time reading the line image(s) (for example, in the process of S210, S240). Thereafter, the processor 811 may proceed with the reading process using line images representing the corrected image. Further, the condition for determining whether the original is a bound document, such as a book, that has been spread open may be a condition other than the condition in S140 of FIG. 2 or the conditions in S620 and S660 of FIG. 9. For example, the user may input information indicating that the original is a book document when inputting a start command for a reading process on the operation interface 850. The processor 811 may determine that the original is a book document based on the information inputted by the user.

(2) The conditions for interrupting the reading device 900 in reading line images may be conditions other than those described in the embodiments. For example, steps S370-S400 may be omitted from the first embodiment in FIG. 3. In this case, the process advances to S210 of FIG. 2 when the processor 811 reaches a NO determination in S360.

In S350 of FIG. 3, the processor 811 may store information specifying the significant-difference position Pxm of each pair of two adjacent target line images (the previous target line image and the current target line image) in the storage 815 (the volatile storage 812, for example). Subsequently, in S360 the processor 811 may determine whether each of the significant-difference positions Pxm is located within the dark region Rd of the current target line image Lc. Here, the significant-difference positions Pxm, which are subject of the determination, include the significant-difference position Pxm in the current target line image Lc and the significant-difference positions Pxm in the target line images read prior to the current target line image Lc. The processor 811 reaches a YES determination in S360 when the significant-difference position Pxm for at least one target line image is located in the dark region Rd of the current target line image Lc. In this case, the processor 811 will determine whether the significant-difference position Pxm of the current target line image will be included within the dark region Rd in each of the N target line images which will be read after the current target line image. Here, N is an integer of 1 or greater, and the dark region Rd in each of the N target line images indicates a range having a density of the threshold Dth or greater which is determined for the respective target line image (each of N line images) read after the current target line image. When the significant-difference position Pxm is present in the dark region Rd of at least one line image, the processor 811 determines that the reading of line images should be interrupted (S360: YES). In this example, each significant-difference position Pxm is determined by comparing a pair of two adjacent target line images. However, a significant-difference position Pxm may be determined by comparing a pair of two target line images which is not adjacent each other. Alternatively, in S350 of FIG. 3, the processor 811 may store information specifying the significant-difference position Pxm of each pair of two adjacent line images among all of read line images in the storage 815. In this case, in S360 the processor 811 may determine whether each of the significant-difference positions Pxm is located within the dark region Rd of the corresponding line image. Here, the significant-difference positions Pxm, which are subject of the determination, include the significant-difference position Pxm in the subject line image and the significant-difference positions Pxm in the line images read prior to the subject line image. The processor 811 reaches a YES determination in S360 when the significant-difference position Pxm for at least one line image is located in the dark region Rd of the subject line image. In this case, the processor 811 will determine whether the significant-difference position Pxm of the subject line image will be included within the dark region Rd in each of the N line images which will be read after the subject line image. Here, N is an integer of 1 or greater, and the dark region Rd in each of the N line images indicates a range having a density of the threshold Dth or greater which is determined for the respective line image (each of N line images) read after the subject line image. When the significant-difference position Pxm is present in the dark region Rd of at least one line image, the processor 811 determines that the reading of line images should be interrupted (S360: YES). In this example, each significant-difference position Pxm is determined by comparing a pair of two adjacent line images. However, a significant-difference position Pxm may be determined by comparing a pair of two line images which is not adjacent each other. For example, two line images in the pair are separated by a prescribed length.

(3) The reference line position Pys in S200 of FIG. 2 may be set according to sizes of standard originals (or standard sizes). In a variation of the embodiments, size information 816 may be stored in the nonvolatile storage 813 (see FIG. 1). The size information 816 specifies relations concerning lengths of the standard original. Specifically, each relation correlates a width Ws with a height Hs of a standard original. Here, the width Ws and the height Hs are a width and height of a book document having a standard size. The width Ws of the book document is the width of a bound document in an open state. The width Ws and height Hs may be expressed in units of pixels, for example. In S200 of FIG. 2, the processor 811 references the size information 816 to identify the standard size having a width Ws closest to the width W identified in S190, and identifies the height Hs based on the identified standard size Ws. Next, the processor 811 sets the reference line position Pys to a position separated in the Y-direction from the leading-edge line image L1 by the height Hs. With this configuration, when reading an original of a standard size, the processor 811 can accurately determine whether a character or other object could be located in the dark region Rd between the current target line image Lc to the reference line image Ls, i.e., a part of the region Rd located on a downstream side of the current target line image Lc in the Y-direction. Thus, the processor 811 can restrict the reading of images that inaccurately represent information in the original.

(4) Various other processes may be used in place of the process shown in FIG. 4 for determining whether to interrupt reading of the image. For example, in response to a rescan command inputted by the user, the processor 811 may resume reading only the unread line images rather than re-executing the reading process from the beginning when the total number of unread line images is small. Alternatively, steps S430 and S440 may be eliminated, and the reading process may end after completing step S420.

(5) Various other processes may be performed in place of the process in FIGS. 9 and 10 as a replacement of S150 in FIG. 2. For example, as in the first embodiment described with reference to FIGS. 6(A) and 6(b), the process in S700-S730 of FIG. 10 may be a process for interrupting reading of the original when the significant-difference position of the maximum density difference Dmax falls in the dark region Rd. Here, the significant-difference position is a counter part of the significant-difference position Pxm and may be identified for each of the perpendicular line images Lt described in FIG. 11 and a position in the Y-direction. The processor 811 may determine that the condition for interrupting reading of the original has been met when a significant-difference position for at least one of the perpendicular line images Lt is located in the dark region Rd.

(6) The reading device 900 and the controller 810 provided in the image-reading apparatus 800 (see FIG. 1) may be separate devices that are connected to each other but accommodated in separate housings. In this case, the system that includes the reading device 900 and the controller 810 may be considered the image-reading apparatus in a broad sense.

Part of the configuration of the disclosure implemented in hardware in the embodiments described above may be replaced by software and, conversely, part of the configuration of the disclosure implemented in software may be replaced by hardware.

When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

While the disclosure has been described in detail with reference to the above embodiments, it would be apparent to those skilled in the art that various changes and modifications may be made thereto.

What is claimed is:

1. An image reading apparatus comprising:
   a platen configured to support an original;
   a reading device configured to optically read the original supported on the platen to obtain a plurality of line images for an entire image including an original image representing the original, wherein each of the plurality of line images extends in a crossing direction crossing an extending direction; and
   a processor configured to perform:
      controlling the reading device to start reading;
      controlling the reading device to read at least one line image;
      specifying a leading edge of the original image from the at least one line image, wherein the leading edge is in a first line image;
      before completing reading the entire image, determining whether a document image to be obtained represents a book document spread open on the platen, the book document being a bound document having a bound portion, wherein the processor determines that the document image to be obtained represents the book document spread open on the platen in a case where the leading edge represents a broken line broken at a center portion thereof;
      in a case where the processor determines that the document image to be obtained represents the book document, determining whether a value satisfies a prescribed condition indicating that a content region is included in a bound-portion region in the document image, the content region being a region in the document image representing a content of the book document and the bound-portion region being a region in the document image representing the bound portion, the value being based on a difference between a first density distribution of an image in a first partial region of the entire image and a second density distribution of an image in a second partial region of the entire image, the first partial region including a part of a dark region, the dark region extending in the extending direction and an image in the dark region having a density larger than a prescribed density threshold value, the first partial region extending in the crossing direction crossing the extending direction, the second partial region including another part of the dark region and extending in the crossing direction, the second partial region being shifted from the first partial region with respect to the extending direction;
   the processor further configured to perform:
      controlling the reading device to read N number of line images, N being an integer larger than two, wherein the N number of line images include a second line image obtained after the first line image is read;
      specifying at least two density distributions of respective ones of at least two of the N number of line images;
      specifying, for a pair of line images among the at least two of the N-number of line images, a maximum difference in density at a same position in the crossing direction between the density distributions corresponding to the pair of line images, the maximum difference being larger than a prescribed difference threshold;
      specifying a position in the crossing direction at which the maximum difference is specified, as a significant-difference position included in the content region; and
      specifying a first range of the dark region in the first line image, the first range having a first width;
      specifying a second range of the dark region in the second line image, the second range having a second width;
      determining whether the significant-difference position is included in a part of the dark region in one of the pair of line images; and
      determining whether the significant-difference position is included in a reference range in a reference line image to be obtained, the reference range being extrapolated by using an index value of the first width, an index value of the second width a distance between the first line image and the second line image, and a distance between the first line image and the reference line image;
      wherein in a case where the processor determines that the significant-difference position is included in a part of the dark region in one of the pair of line images, the processor determines that the value satisfies the prescribed condition,
      in a case where the value satisfies the prescribed condition, controlling the reading device to interrupt reading the entire image; and
      in a case where the value does not satisfy the prescribed condition:
         controlling the reading device to continue reading the entire image so that all of the plurality of line images is read; and
         generating read data using the plurality of line images.

2. The image reading apparatus according to claim 1, wherein the processor is configured to further perform:
   in a case where the processor determines that the significant-difference position is not included in the part of the dark region in one of the pair of line images, specifying, for another pair of line images among the at least two of the N-number of line images, another maximum difference in density at a same position in the crossing direction between the density distributions corresponding to the another pair of line images, the maximum difference being larger than a prescribed difference threshold;
   specifying a position in the crossing direction at which the another maximum difference is specified, as another significant-difference position; and
   determining whether the another significant-difference position is included in a part of the dark region in one of the another pair of line images,
   wherein in a case where the processor determines that the another significant-difference position is included in another part of the dark region in one of the another pair of line images, the processor determines that the value satisfies the prescribed condition.

3. The image reading apparatus according to claim 1, further comprising a memory configured to store size information which correlates a width of a standard original with a height of the standard original,
   wherein the processor is configured to further perform:

specifying a width of the original by analyzing a part of the plurality of line images which is read by the reading device;

specifying a height of the original using the size information and the specified width; and setting a position of the reference line image apart from the first line image by using the specified height.

4. The image reading apparatus according to claim 1, wherein the processor is configured to further perform:

specifying a width of the original by analyzing a part of the plurality of line images which is read by the reading device; and setting a position of the reference line image apart from the first line image by using a length obtained by multiplying the width by a coefficient smaller than one.

5. The image reading apparatus according to claim 1, wherein the processor is configured to further perform:

controlling the reading device to read a first target line image as the document image in the first partial region;

specifying a density distribution of the first target line image as the first density distribution;

calculating a first rate of a first change to a second change, the first change being a change in density between a first position and a second position, each of the first position and the second position being a position in the first target line image in the crossing direction, density at the first position being darker than a prescribed second density threshold value, density at the second position being lighter than the prescribed second density threshold value, the second change being a change in position between the first position and the second position;

controlling the reading device to read a second target line image as the document image in the second partial region after the reading device reads the first target line image;

specifying a density distribution of the second target line image as the second density distribution; and calculating a second rate of a third change to a fourth change, the third change being change in density between a third position and a fourth position, each of the third position and the fourth position being a position in the second target line in the crossing direction, density at the third position being darker than the prescribed second density threshold value, density at the second position being lighter than the prescribed second density threshold value, the fourth change being a change in position between the third position and the fourth position, wherein the processor determines that the value satisfies the prescribed condition when a difference between the first rate and the second rate exceeds a prescribed rate threshold value.

6. The image reading apparatus according to claim 1, where each of the plurality of line images extends in a line direction, wherein the processor is configured to further perform:

controlling the image reading device to read first target line images among the plurality of line images; and specifying an edge of the original image in the line direction by using the first target line images, wherein the processor determines that that the original image to be obtained represents the book document spread open on the platen in a case where the edge represents a broken line.

7. The image reading apparatus according to claim 6, wherein the processor is configured to further perform, in a case where the processor determines that the original image to be obtained represents the book document spread open on the platen, controlling the image reading device to read at least one second target line image other than the first target line images so that the entire dark region is read, wherein the processor determines whether the value satisfies the prescribed condition by using the read first target line images and the read at least one second target line image.

8. The image reading apparatus according to claim 6, wherein the processor is configured to further perform:

in a case where the edge represents a broken line, controlling the image reading device to read third target line images other than the first target line images, and specifying an edge of the original image in the line direction by using the third target line images, wherein the processor determines that that the original image to be obtained represents the book document spread open on the platen in a case where the edge reappears in the line direction.

9. The image reading apparatus according to claim 1, further comprising:

a display; and an interface, wherein the processor is configured to further perform:

displaying, on the display, information indicating reading is interrupted in a case where the processor controls the reading device to interrupt reading the original image of the original; and starting, after the processor controls the reading device to interrupt reading the original image, reading the original again in a case where an instruction for rescanning is inputted via the interface.

10. The image reading apparatus according to claim 1, wherein the processor is configured to further perform:

controlling the reading device to read first target line images among the plurality of line images;

specifying a leading edge of the original image from the first target line images, specifying an edge of the original image in the line direction by using the first target line images in a case where the leading edge does not represent a broken line broken at a center portion thereof, wherein the processor determines that the original image to be obtained represents the book document spread open on the platen, in a case where the leading edge represent a broken line broken at a center portion thereof or the edge represents a broken line broken at a center portion thereof.

11. A non-transitory computer-readable recording medium storing computer-readable instructions for an image reading apparatus including: a platen configured to support an original; a reading device configured to optically read the original supported on the platen to obtain a plurality of line images for an entire image including an original image representing the original, wherein each of the plurality of line images extends in a crossing direction crossing an extending direction; and a processor, wherein the computer-readable instructions, when executed by the processor, cause the image reading apparatus to perform:

controlling the reading device to start reading;

controlling the reading device to read at least one line image;

specifying a leading edge of the original image from the at least one line image, wherein the leading edge is in a first line image;

before completing reading the entire image, determining whether a document image to be obtained represents a book document spread open on the platen, the book document being a bound document having a bound portion, wherein the processor determines that the document image to be obtained represents the book document spread open on the platen in a case where the leading edge represents a broken line broken at a center portion thereof;

in a case where it is determined that the document image to be obtained represents the book document, determining whether a value satisfies a prescribed condition indicating that a content region is included in a bound-portion region in the document image, the content region being a region in the document image representing a content of the book document and the bound-portion region being a region in the document image representing the bound portion, the value being based on a difference between a first density distribution of an image in a first partial region of the entire image and a second density distribution of an image in a second partial region of the entire image, the first partial region including a part of a dark region, the dark region extending in the extending direction and an image in the dark region having a density larger than a prescribed density threshold value, the first partial region extending in the crossing direction crossing the extending direction, the second partial region including another part of the dark region and extending in the crossing direction, the second partial region being shifted from the first partial region with respect to the extending direction;

wherein the computer-readable instructions, when executed by the processor, cause the image reading apparatus to further perform:

controlling the reading device to read N number of line images, N being an integer larger than two, wherein the N number of line images include a second line image obtained after the first line image is read;

specifying at least two density distributions of respective ones of at least two of the N number of line images;

specifying, for a pair of line images among the at least two of the N-number of line images, a maximum difference in density at a same position in the crossing direction between the density distributions corresponding to the pair of line images, the maximum difference being larger than a prescribed difference threshold;

specifying a position in the crossing direction at which the maximum difference is specified, as a significant-difference position included in the content region; and specifying a first range of the dark region in the first line image, the first range having a first width;

specifying a second range of the dark region in the second line image, the second range having a second width;

determining whether the significant-difference position is included in a part of the dark region in one of the pair of line images; and determining whether the significant-difference position is included in a reference range in a reference line image to be obtained, the reference range being extrapolated by using an index value of the first width, an index value of the second width, a distance between the first line image and the second line image, and a distance between the first line image and the reference line image;

wherein in a case where it is determined that the significant-difference position is included in a part of the dark region in one of the pair of line images, the processor determines that the value satisfies the prescribed condition, in a case where the value satisfies the prescribed condition, controlling the reading device to interrupt reading the entire image; and in a case where the value does not satisfy the prescribed condition:

controlling the reading device to continue reading the entire image so that all of the plurality of line images is read; and generating read data using the plurality of line images.

12. A method for controlling an image reading apparatus including: a platen configured to support an original; a reading device configured to optically read the original supported on the platen to obtain a plurality of line images for an entire image including an original image representing the original, wherein each of the plurality of line images extends in a crossing direction crossing an extending direction; and a processor, the method comprising:

controlling the reading device to start reading;

controlling the reading device to read at least one line image;

specifying a leading edge of the original image from the at least one line image, wherein the leading edge is in a first line image;

before completing reading the entire image, determining whether a document image to be obtained represents a book document spread open on the platen, the book document being a bound document having a bound portion, wherein the processor determines that the document image to be obtained represents the book document spread open on the platen in a case where the leading edge represents a broken line broken at a center portion thereof;

in a case where it is determined that the document image to be obtained represents the book document, determining whether a value satisfies a prescribed condition indicating that a content region is included in a bound-portion region in the document image, the content region being a region in the document image representing a content of the book document and the bound-portion region being a region in the document image representing the bound portion, the value being based on a difference between a first density distribution of an image in a first partial region of the entire image and a second density distribution of an image in a second partial region of the entire image, the first partial region including a part of a dark region, the dark region extending in the extending direction and an image in the dark region having a density larger than a prescribed density threshold value, the first partial region extending in the crossing direction crossing the extending direction, the second partial region including another part of the dark region and extending in the crossing direction, the second partial region being shifted from the first partial region with respect the extending direction;

the method further comprising:

controlling the reading device to read N number of line images, N being an integer larger than two, wherein the N number of line images include a second line image obtained after the first line image is read;

specifying at least two density distributions of respective ones of at least two of the N number of line images;

specifying, for a pair of line images among the at least two of the N-number of line images, a maximum difference in density at a same position in the crossing direction between the density distributions corresponding to the pair of line images, the maximum difference being larger than a prescribed difference threshold;

specifying a position in the crossing direction at which the maximum difference is specified, as a significant-difference position included in the content region; and specifying a first range of the dark region in the first line image, the first range having a first width;

specifying a second range of the dark region in the second line image, the second range having a second width;

determining whether the significant-difference position is included in a part of the dark region in one of the pair of line images; and determining whether the significant-difference position is included in a reference range in a reference line image to be obtained, the reference range being extrapolated by using an index value of the first width, an index value of the second width, a distance between the first line image and the second line image, and a distance between the first line image and the reference line image;

wherein in a case where it is determined that the significant-difference position is included in a part of the dark region in one of the pair of line images, the processor determines that the value satisfies the prescribed condition, in a case where the value satisfies the prescribed condition, controlling the reading device to interrupt reading the entire image; and in a case where the value does not satisfy the prescribed condition:
  controlling the reading device to continue reading the entire image so that all of the plurality of line images is read; and
  generating read data using the plurality of line images.

* * * * *